United States Patent [19]

Hirota et al.

[11] Patent Number: 4,661,822

[45] Date of Patent: Apr. 28, 1987

[54] INK JET PRINTER

[75] Inventors: Tetsuro Hirota, Zama; Shigeyuki Araki, Komae; Shizuo Yokoyama, Atsugi; Haruyoshi Masui, Yokohama; Toshitaka Hirata, Tokyo, all of Japan

[73] Assignee: Ricoh Company, Ltd., Tokyo, Japan

[21] Appl. No.: 838,337

[22] Filed: Mar. 10, 1986

[30] Foreign Application Priority Data

Mar. 11, 1985 [JP] Japan .................................. 60-47808

[51] Int. Cl.[4] .............................................. G01D 15/18

[52] U.S. Cl. .................................. 346/75; 346/140 R

[58] Field of Search .............................. 346/75, 140 R

[56] References Cited

U.S. PATENT DOCUMENTS 4,535,339 8/1985 Horine et al. ......................... 346/75

4,555,711 11/1985 Sato ......................................... 346/75

*Primary Examiner*—E. A. Goldberg

*Assistant Examiner*—Gerald E. Preston

*Attorney, Agent, or Firm*—Mason, Fenwick & Lawrence

[57] ABSTRACT

An ink jet printer includes a pump which pressurizes an ink to be supplied to a nozzle, which projects an ink jet. When the ink pressure which is supplied to the nozzle exceeds a given value or when the deflection of the ink jet is improper, pressure oscillations are applied to the nozzle by alternately and repeatedly driving and ceasing to drive the pump in order to remove a plugging of the nozzle. If the repeated operation does not result in a reduced ink pressure, the nozzle is connected to a low pressure ink vessel, causing the pressure prevailing within the nozzle to be reduced.

9 Claims, 18 Drawing Figures

INK JET PRINTER

FIELD OF THE INVENTION

The invention relates to an ink jet printer in which ink under pressure is projected from a nozzle, and more particularly, while not limited thereto, to the control of the supply of ink under pressure to a nozzle by means of a pressure pump in an ink jet printer as disclosed in pending U.S. patent application Ser. No. 755,174 filed July 15, 1985 in the name of Tetsuro Hirota and assigned to the assignee of the present application.

BACKGROUND OF THE INVENTION

In an ink jet printer, of charge controlled type, for example, in which ink under pressure is projected from a nozzle, ink is pumped by a pump from an ink vessel to be supplied to an ink projecting head. The ink projecting head is provided with a vibrator, which vibrates at a given frequency to impart pressure oscillations of a given period to the ink received within the head. The ink is normally projected from the nozzle under a given pressure and with a given pressure oscillation, whereby the ink stream is separated into ink particles at a given distance from the nozzle. A charging electrode is disposed forwardly of the nozzle, and when a charging voltage is applied between the charging electrode and the ink contained within the head in synchronism with the separation of the stream of an ink jet into ink particles, the resulting ink particles will bear an electric charge which depends on the magnitude of the charging voltage. The charged ink particles are deflected by an electric field established across a pair of deflection electrodes for impingement upon a record paper. An ink jet printer of the type described is well known, and is disclosed, for example, in U.S. Pat. No. 3,596,275 issued to Richard G. Sweet and U.S. Pat. No. 4,045,770 issued to Robert Walker Arnold et al.

A plugging of the nozzle presents a problem in an ink jet printer of the type described. Specifically, solvent may be evaporated from the ink disposed inside or outside the nozzle over time during which the printer remains out of use, and consequently, the ink may be solidified or has its viscosity increased to a high value, preventing a proper projection of an ink stream. The plugging may also be caused by deposition of dust such as minute fragments of paper into the ink around the nozzle to close it.

When the nozzle is plugged, the ink pressure in the head which projects an ink stream rises during the time an associated pump is being driven. If the pumping operation is allowed to continue and the pressure rises, a deformation or damages of the head or ink feed pipe or a burn-out of the pump may result. To avoid these occurrences, it has been the prior art practice to detect the ink pressure which is supplied to the head and to interrupt the operation of the pump immediately upon a given pressure being reached, producing an alarm to switch the system into a standby mode.

In this respect, it is to be noted that an alarm may be produced and the system may be switched to a standby mode by interrupting the operation of the pump when a phase retrieval or a deflection control failed to establish a proper condition, based on the assumption that such failure is caused by the imperfect projection of an ink stream. In another mode, an indicator which requires a call-up for a serviceman may be energized.

From the foregoing, it will be seen that there has been a relatively frequent occurrence in the prior art practice that a standby mode in which the projection of an ink stream is interrupted is established due to the plugging or the possibility of plugging of the ink projecting head, in particular, when the printer is used infrequently or the printer is left out of use over an increased length of time. Accordingly, there arises a problem that a print-out at a desired time is disabled or a problem that the maintenance required an increased amount of labor or manual intervention in checking or cleaning the head.

SUMMARY OF THE INVENTION

It is an object of the invention to increase the reliability of a printer by reducing the chance of a disabled print-out due to the imperfect projection of an ink stream from the nozzle of an ink projecting head or by reducing the frequency of checking or cleaning the head.

The degree to which the nozzle of an ink projecting head becomes plugged depends on the environment in which the printer is placed or the length of time during which the printer has been left out of use. The imperfect projection of an ink stream may be caused by various factors and occur in different manners. In one instance, the ink located within the nozzle may be completely solidified to cause a perfect plugging. Alternatively, dust such as powder of paper may be precipitated into a high viscosity ink located within the nozzle or a solidified component of the ink may adhere to a portion of the nozzle, thus causing the ink stream to be projected in an improper direction or at an undesirable speed even though the ink stream itself can be projected. It is found that in most cases, if an ink stream is maintained though the flow rate may be reduced, such ink stream is effective to flush away or urge dust or solidified ink component out of the intended path, re-establishing a proper ink projection in the course of the continued projection of the ink stream. In an experiment conducted by the inventor, it is found that when the internal pressure of the head rises due to the plugging of the nozzle, the internal pressure within the head can be reduced to the atmospheric pressure and the head is allowed to remain under this condition for a time interval on the order of five minutes and then the pump may be driven again to re-establish an ink flow from the nozzle successfully. A proper projection of an ink stream is achieved in the course of the continued operation. It will be seen that in these circumstances, the time and labor required to enable a print-out operation can be greatly reduced by applying a reasonable control over the ink pressure rather than by a shutdown of the printer.

Accordingly, in accordance with the invention, the proper or improper projection of an ink stream is detected in terms of an ink pressure prevailing in an ink flow passage extending to an ink projecting nozzle from the discharge port of a pump which supplies ink under pressure to the head, or in terms of a preset deflection. If it is found that an improper projection occurs, for example, if the ink pressure rises to a high value or no suitable deflection can be established, the ink supply is performed under a reduced pressure as by alternately driving and ceasing to drive the pump.

When such technique is employed, a certain pressure is established in the ink within the ink projecting head as a result of a repetition of driving and ceasing to drive the pump. Where the nozzle is not completely plugged, a proper projection is achieved within a short time interval. If a significant degree of plugging exists, an ink flow is frequently established though in a reduced amount. However, an ink flow in a reduced amount is effective to flush away the inside of the nozzle by substituting a fresh ink for a highly viscous ink lodged within the head, presenting a high probability that a proper projection of an ink stream is established. The rate of pressure rise within the ink projecting head is lower than for a normal continuous operation. This technique is most effective when there is an ink flow of a reduced amount from the nozzle.

Where the nozzle is plugged to a greater degree or when it is completely plugged, there is a minimal flow of ink stream therefrom, and hence the internal pressure within the head rises in response to a repetition of driving and ceasing to drive the pump. In a preferred embodiment of the invention, therefore, when the ink pressure which is obtained as a result of repeating driving and ceasing to drive the pump for a given number of times is high, the operation of the pump is interrupted, and a solenoid valve unit is alternately changed between a first condition in which the ink projecting head communicates with a low pressure vessel and a second condition in which the head is disconnected from the low pressure vessel, thus causing the ink pressure within the head to fall. Subsequently, driving and ceasing to drive the pump as well as the ink pressure release are re-initiated. If a reduction in the pressure which results from the projection of an ink stream cannot be attained within a given time interval, for example, five minutes, the operation of the pump is interrupted, and an alarm indicating the occurrence of an abnormality is produced.

With this arrangement, the printer is shut down and assumes a standby condition only when a high degree of imperfect projection of an ink stream occurs, and for all other levels of improper projections, a proper projection of an ink stream is reached autonomously. As a result, the chance of the disabled print-out due to the improper projection of an ink stream from the nozzle of the head or the required frequency of checking or cleaning of the head can be reduced, thus enhancing the reliability of the printer.

Other objects and features of the invention will become apparent from the following description with reference to the drawings.

DESCRIPTION OF PREFERRED EMBODIMENT

Figure 1A:
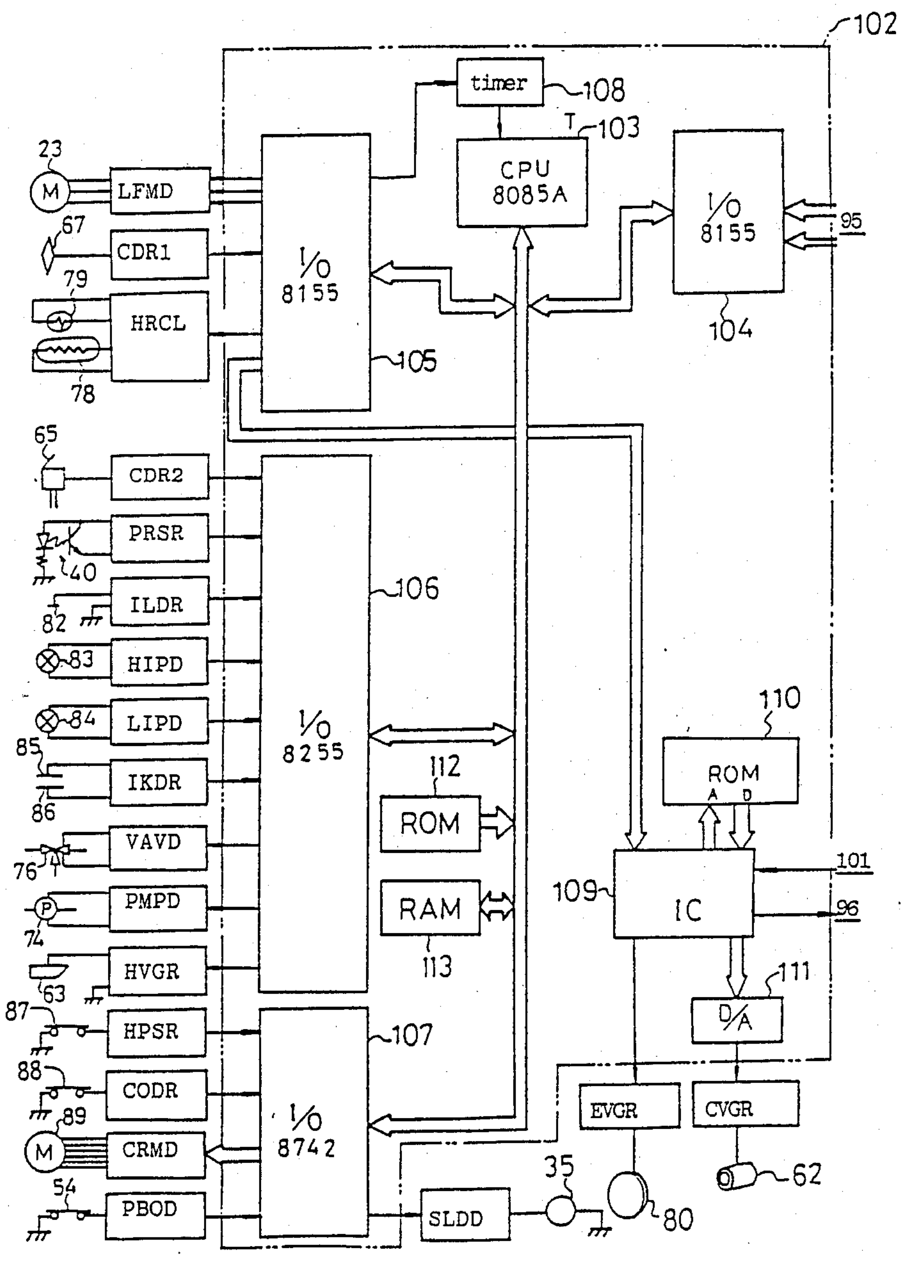
FIG. 1*a* is a block diagram schematically illustrating a part of an electrical control for one embodiment of the invention.
Figure 1B:
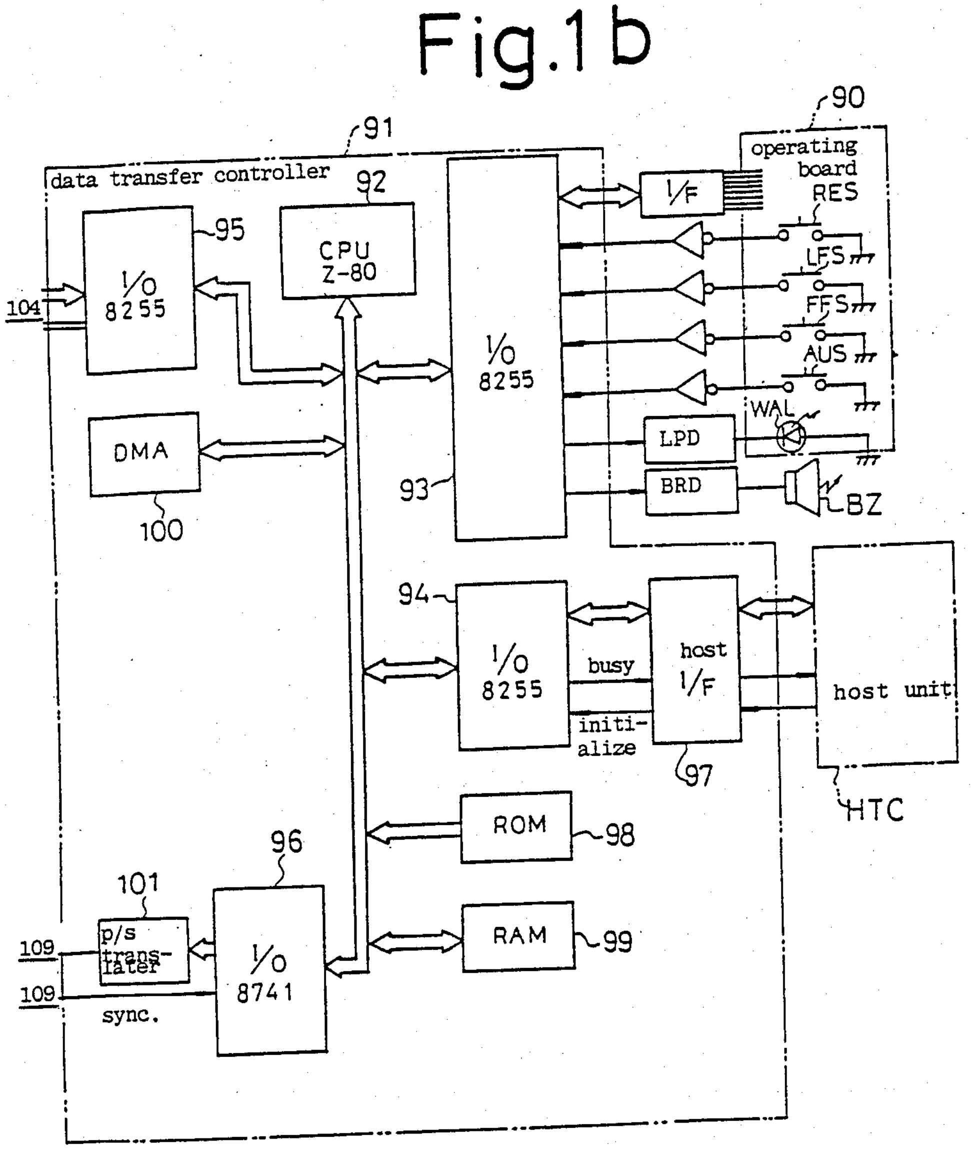
FIG. 1*b* is a block diagram schematically illustrating another part of the electrical control for the embodiment.

Referring to FIGS. 1*a* and 1*b*, there are shown various electrical components which are used in an embodiment of the invention. The embodiment is implemented as an ink jet printer which records an image based on print data which is supplied together with control signals from a host unit HTC which may comprise a computer, a word processor, a scanner or like data processor. The electrical control of the printer shown in FIGS. 1*a* and 1*b* generally comprises a data transfer controller 91 (FIG. 1*b*) and a print controller 102 (FIG. 1*a*) which is connected with the controller 91.

The data transfer controller 91 (FIG. 1*b*) comprises a microprocessor (hereafter referred to as CPU)92, input/output units 93 to 96, a host interface 97, ROM 98, RAM 99, a parallel to serial translator which translates data from a parallel form into serial form, and a plurality of buses including an address bus, a data bus and a control bus. A host unit HTC is connected to the host interface 97 through a connector, not shown. An operating board 90 of the printer is connected to the input/output unit 93, which is also connected to a buzzer BZ.

Figure 2:
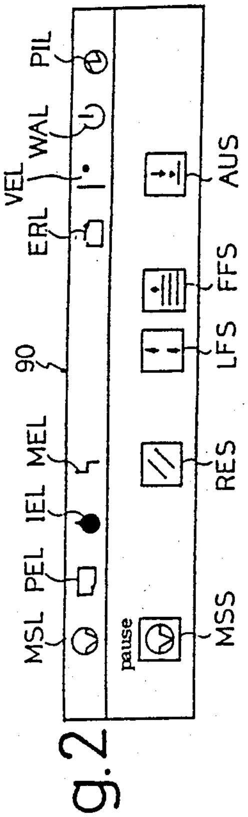
FIG. 2 is a plan view of an operating board used in embodiment of FIGS. 1*a* and 1*b*.

The appearance of the operating board 90 is illustrated in FIG. 2. In the illustration of FIGS. 1*b* and 2, the following characters are used as abbreviations:

RES: reset switch
LFS: line feed switch
FFS: page-out switch
AUS: automatic loading switch
WAL: standby lamp (light emitting diode)
PIL: power supply indicator lamp
VEL: paper bail open indicator lamp
ERL: cover open indicator lamp
LPD: lamp driver
BRD: buzzer driver The print controller 102 (FIG. 1*a*) comprises CPU 103, input/output units 104 to 107, a timer 108, ROM 110 which stores data used to correct for a distortion in the charge, an integrating circuit 109 which calculates a correction to correct for a distortion of the charge, D/A converter 111, ROM 112 and RAM 113. Control data and control signals from the operating board 90 and the host unit HTC are supplied to the input/output unit 104 of the print controller 102 from the input/output unit 95 of the data transfer controller 91. Display data supplied to the operating board 90 is transmitted to the input/output unit 95 of the data transfer controller 91 from the input/output unit 104 of the print controller 102. Data to be printed is supplied to the calculation IC 109 of the print controller 102 through the parallel/-serial translator 101 of the data transfer controller 91. The input/output units 105 to 107 and the calculation IC 109 of the print controller 102 are connected to a variety of drivers which energize or activate various electrical components relating to the operation of the ink jet printer and to signal processing circuits associated with various sensors which detect the status of these components, as illustrated in FIG. 1*a*. It should be understood that elements which are not directly related to the operation of the invention are omitted from illustration to preserve the clarity of the drawings.

The electrical components and sensors connected to the print controller 102 (FIG. 1a) will now be described. A line feed motor 23 is formed by a pulse motor which performs a paper feed operation. A charge detecting electrode 67 is mounted in an ink trap 66 which will be described later. When a charged ink particle impinges thereon, a signal indicating the presence of a charge is fed from a charge detector circuit to the print controller 102. The ink trap 66 may be an ink trap as disclosed in a pending U.S. patent application Ser. No. 700,024, filed Aug. 2, 1984 in the name of Ishikawa et al, or an ink trap disclosed in Japanese Laid-Open patent application No. 108,167/1983. An ink temperature sensor is indicated at 79 which is shown adjacent to an ink heater 78. During the time the print controller 102 provides an on control, the energization of the heater 78 is controlled by a heater control circuit so that the temperature detected by the sensor 79 is equal to a given value.

A gutter 65 formed by an electrical conductor is adapted to capture an ink which is not used in a printing operation, and is connected to a charge detector circuit. When an impingement of charged ink particles upon the conductor gutter occurs, the charge detector circuit provides a signal indicating the presence of a charge and feeds it to the print controller 102. A paper sensor 40 is disposed rearwardly of a platen, as will be further described later. A light signal received by the paper sensor is processed by a paper sensor circuit, which provides a signal indicating the presence or absence of a paper, which is fed to the print controller 102. An electrode 82 is disposed within an ink reservoir to detect an ink level. When the electrode 82 is contacted by the liquid ink, a signal indicating the presence of an ink is fed by an ink level detector circuit to the print controller 102. Obviously, when the electrode 82 is not contacted by the ink liquid, the detector circuit supplies a signal indicating the absence of the ink.

A pair of pressure sensors 82 and 83 detects the ink pressure within an accumulator. A high ink pressure detector circuit feeds an overpressure signal to the print controller 102 when the ink pressure within the accumulator exceeds a given value. Similarly, a low ink pressure detector circuit feeds an underpressure signal to the print controller 102 when the ink pressure within the accumulator is less than a different given value.

A pair of electrodes 85 and 86 are disposed on the bottom of the carriage at locations where the ink tends to accumulate. When a flow communication between the both electrodes occurs, an ink detector circuit feeds a signal indicating the occurrence of an ink leakage to the print controller 102.

The energization of a solenoid-operated switching valve 76 is controlled by a valve driver in response to a command from the print controller 102. When energized, the valve 76 establishes a communication between the accumulator 75 and the ink jet projecting head 61 and interrupts the communication between the accumulator 75 and the head 61 on one hand and the waste vessel (low pressure vessel) 81 on the other hand. When deenergized, it establishes a communication between the head 61 and the waste vessel 81 and interrupts the communication between the head 61 and the waste vessel 81 on one hand and the accumulator 75 on the other.

A pressure pump 75 withdraws an ink from the ink reservoir and feeds the ink under the pressure to the accumulator. It is energized by a pump driver as long as the print controller 102 delivers an on command.

One of deflecting electrodes, to which a high voltage is applied is shown at 63. As long as the print controller 102 delivers a deflection voltage on command, a high voltage generator applies a high voltage of a given magnitude to the electrode 63.

A microswitch 87 is closed when the carriage assumes its home position and is open when the carriage is displaced therefrom, and may be considered as a home position sensor. A signal indicating the closure or opening of the switch is fed by a home position detector circuit to the print controller 102. Another microswitch 88 is opened and closed as a cover of the printer is opened or closed, and a corresponding signal is fed by a cover open detector circuit to the print controller 102.

A carriage drive motor 89 comprises a pulse motor, and its energization is controlled by a carriage motor driver 89 which responds to an energize signal delivered by the print controller 102.

A microswitch 54 is adapted to detect the opening or closure of a paper bail which will be described later, and a corresponding signal is fed by a paper bail open detector circuit to the print controller 102.

A paper bail drive solenoid 35 is energized by a solenoid driver when an on signal is supplied thereto.

Data presenting a charging voltage is applied to D/A converter 111, and a corresponding analog voltage is applied to the charging electrode 62 by the charging voltage generator.

The ink jet projecting head includes an electrostrictive vibrator 80, and an exciting base pulse is applied to an exciting voltage generator which develops an analog exciting voltage having substantially sinusoidal waveform, which is applied to the vibrator 80. The ink which passes through the nozzle of the head is modulated by a pressure oscillation which is produced by the vibrator, whereby after the projection from the nozzle, the ink will be divided into ink particles at a periodic interval after travelling through a given distance.

Figure 3:
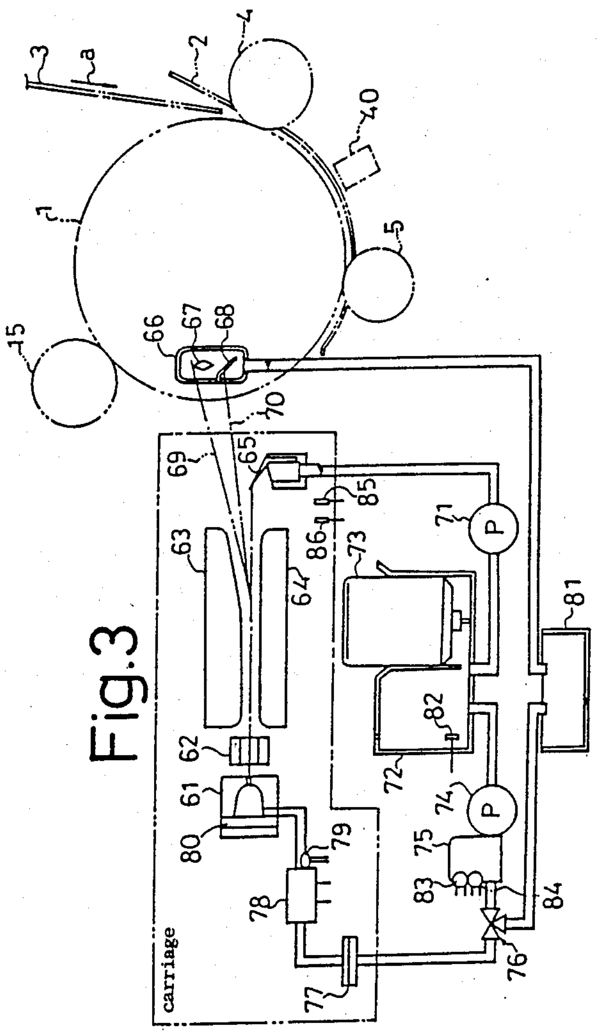
FIG. 3 is a schematic view of an ink circulating system of the embodiment shown in FIGS. 1*a* and 1*b*.

In the illustration of FIG. 1a, the following characters are used as abbreviations:

LFMD: line feed motor driver
CDR1: charge detector
HRCL: heater control
CDR2: charge detector
PRSR: paper sensor
ILDR: ink level detector
HIPD: high ink pressure detector
LIPD: low ink pressure detector
IKDR: ink detector
VAVD: valve driver
PMPD: pump driver
HVGR: high voltage generator
HPSR: home position sensor
CODR: cover open detector
CRMD: carriage motor driver
PBOD: paper bail open detector
SLDD: solenoid driver
EVGR: exciting voltage generator
CVGR: charging voltage generator FIG. 3 shows the general arrangement of an ink circulating system which is used in this embodiment. An ink reservoir 72 contains an ink which is supplied from a cartridge 73. An ink from the reservoir 72 is pumped to an accumulator by a pressure pump 74. From the accumulator, the ink is fed through the solenoid operated switching valve 76 and through a filter 77 to be supplied to an ink jet projecting head 61. An ink stream or jet which is projected from a nozzle of the head 61 is divided into ink particles at the location of the charging electrode 62. If the ink particles are not charged, they move straightforward for impingement upon the gutter 65. The filter 77, the heater 78, the head 61, the charging electrode 62, the pair of deflecting electrodes 63, 64, the gutter 65 and the pair of ink detecting electrodes 85, 86 are mounted on a carriage, not shown. An ink trap 66 is disposed so that its opening is located to receive ink particles which are projected from the head 61 and subject to deflection in excess of a given amount whenever the carriage is at its home position which is out of recording positions. An ink recovered by the ink trap 66 flows to a waste vessel 81.

The ink which is captured by the conductive gutter is withdrawn by a pump 71 to be returned to the ink reservoir 72.

When the switching valve 76 is deenergized, the ink outlet of the accumulator 75 is closed while a communication is established between the filter 77 and the waste vessel (low pressure vessel) 81, whereby the ink located across the filter 77 flows to the waste vessel until the ink pressure within the head 61 reduces to the atmospheric pressure. The ink in the waste vessel is distarded at a suitable timing. It is to be noted that only the ink which is captured by the gutter 65 is returned to the ink reservoir for re-use.

FIG. 3 also shows a platen 1 around which a recording paper 3 is disposed by being guided by a deflector 2 into the nip between the platen and pressure rollers 4 and 5. A paper bail roller 15 is effective to hold the recording paper against the platen.

The paper sensor 40 is disposed substantially midway intermediate the pressure rollers 4 and 5. The sensor 40 is disposed rearwardly of the platen 1 for two reasons. First, it is difficult to dispose the paper sensor on the front side of the platen because the carriage is located very close to the front side of the platen, almost in contact therewith, and reciprocates along a platen shaft, which extends in a direction perpendicular to the plane of FIG. 3. Second, when the sensor is disposed on the front side of the platen, it is readily contaminated by an ink, increasing the maintenance work including the cleaning operation The absence of the paper sensor at the record position or on the front side of the platen 1 in a region between the rollers 5 and 15, as viewed in FIG. 3, requires that the relationship between the record paper and a record position, namely, the point on the record paper where a recording operation by the head 61 takes place, must be determined as a function of the amount of paper feed which is applied after the leading edge of the record paper 3 has reached the paper sensor 40. The location of the trailing edge of the record paper 3 must be similarly determined as a function of the amount of paper feed which occurs after the trailing edge of the record paper 3 has passed through the paper sensor 40. For this reason, a paper position is automatically tracked by an arithmetic operation which is based on a detection signal from the paper sensor 40.

Figure 5:
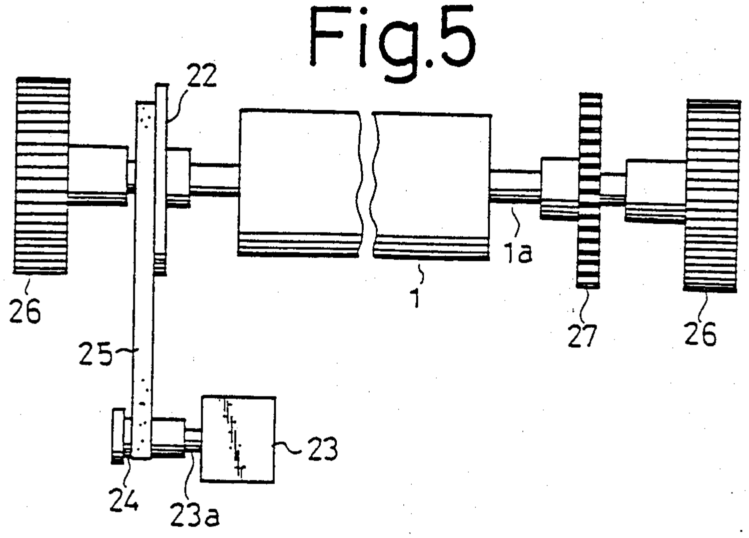
FIG. 5 is a front view of a platen drive system of the ebodiment shown in FIGS. 1*a* and 1*b*.

The platen 1 is driven by the motor 23 (see FIG. 5) or by a manual rotation of a platen knob 26 (FIG. 5). In this circumstance, it is possible that when the paper is loaded properly and is detected by the sensor 40, the paper may be moved back or withdrawn in the opposite direction from the direction of insertion. In this instance, the logic may indicate the presence of the paper when there is no paper over the platen actually. Alternatively, the platen knob may be manually turned to deliver the paper out of the platen, but the logic may indicate that the trailing edge of the paper is located between the roller 5 and the recording position even though the sensor 40 indicatcs the absence of paper. If these events happen and an ink jet recording operation takes place, an inkjet will be projected against the platen 1 to mar it, requiring time and labor for its cleaning. In the embodiment being described herein, a paper feed control is incorporated which overcomes this problem, as will be further described later.

Figure 4:
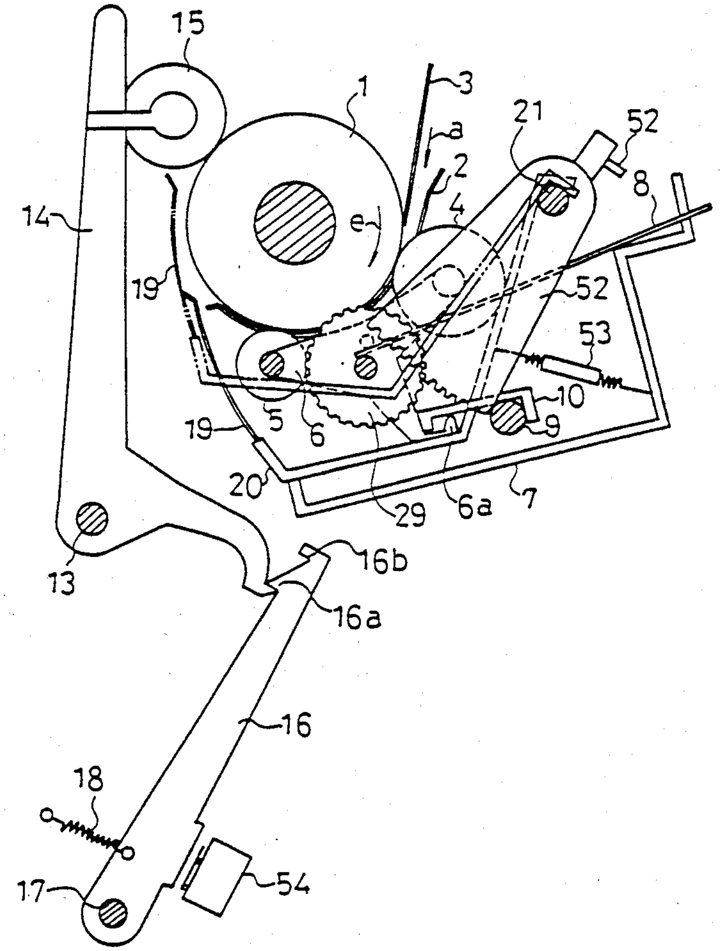
FIG. 4 is a side elevation of a feed mechanism of the embodiment shown in FIGS. 1*a* and 1*b*.

A paper feed mechanism will now be described. Referring to FIG. 4 initially, the deflector 2 in the form of curved or weavy plate is disposed adjacent to the platen 1 which is in the form of a roller. The deflector 2 guides the paper 3, which is inserted in a direction indicated by an arrow a, to move along the platen 1. A plurality of openings are formed in the deflector 2, and two rows of pressure rollers 4, 5 are disposed adjacent to these openings.

These pressure rollers 4, 5 are mounted on shafts which are carried by a holding member 6, which is urged toward the platen 1, by a leaf spring 8 having its one end secured to a stationary member 7, whereby the pressure rollers 4, 5 are urged against the platen 1.

The lower end of the holding member 6 is formed with a tab 6*a*, and a rotary shaft 9 is disposed adjacent to the tab 6*a*. A release element 10 is secured to the rotary shaft 9 and has its free end disposed so as to be engageable with the tab 6*a* of the holding member 6.

Figure 7:
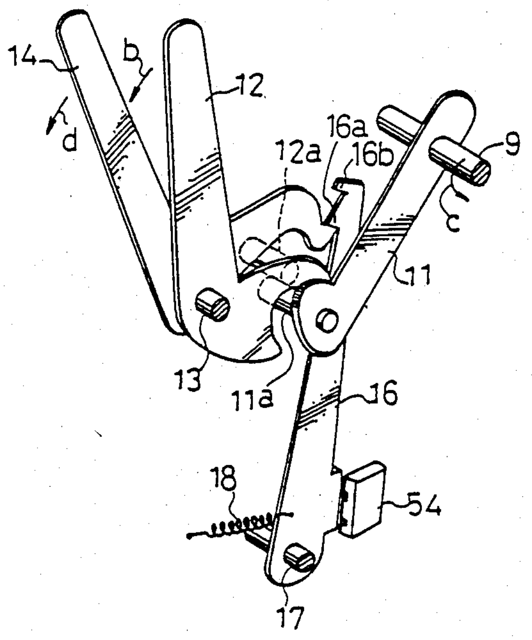
FIGS. 7 is a perspective view of a paper bail roller drive system of the embodiment shown in FIGS. 1*a* and 1*b*.

As shown in FIG. 7, a top portion of a swinging lever 11 is fixedly connected with the rotary shaft 9, and a lug 11*a* extends from the lower end of the level 11. A release lever 12 is pivotally mounted on a support shaft 13 and has its lower end engaged with the lug 11*a* extending from the lever 11. When the top end of the release lever 12 is rotated by a finger, in a direction indicated by an arrow b, the lever 11 rotates to turn the rotary shaft 9 in a direction indicated by an arrow c. This causes the release element 10 to force the tab 6*a* of the holding member 6 down against the resilience of the spring 8, thus moving the pressure rollers 4, 5 away from the platen 1. If the top end of the release lever 12 is now rotated in the opposite direction from the direction indicated by the arrow b, the release element 10 is disengaged from the tab 6*a*, whereby the pressure rollers 4, 5 can be brought into abutting relationship with the platen 1 under the resilience of the spring 8.

A paper bail lever 14 is rotatably mounted on the support shaft 13 adjacent to the platen 1, and carries the paper bail roller 15 on its top. Rotatably disposed below the paper bail lever 14 is a swinging lever 16 on a support shaft 17 so as to be engageable with the lever 14. The lever 16 is urged to rotate counter-clockwise by a tension spring 18. The upper end of the lever 16 is formed with a tab 16, and the lever 14 is adapted to engage the lever 16 in two steps. When the bail lever 14 moves angularly to engage under the tab 16*a* of the lever 16, the paper bail roller 15 is maintained in abutment against the platen 1 under the tension of the spring 18.

When the upper end of the bail lever 14 is moved away from the platen 1 by a finger, the lower end of the lever 14 angularly moves the lever 16 against the resilience of the spring 18, thus moving past the tab 16*a* and becomes locked by a detent 16*b* formed on the lever 16, where the paper bail roller 15 is spaced from the platen 1.

Conversely, if the paper bail lever 14 is moved angularly in a direction toward the platen 1 by using a finger when the roller 15 is spaced form the platen 1, the lower end of the lever 14 moves past the tab 16*a* to be engaged with the underside thereof, whereupon the roller 15 is returned to its original position where it abuts against the plate 1.

When the release lever 12 is moved angularly in the direction of the arrow b shown in FIG. 7 in order to move the pressure rollers 4, 5 away from the platen 1, a lug 12*a* on the release lever 12 engages the lower end of the lever 14 and causes the lever 14 to move in the direction of the arrow b so that its lower end moves past the tab 16*a*, whereby the roller 15 is also moved away from the platen 1. It is noted that the lever 14 can be operated independently from the release lever 12.

An auxiliary guide 19 in the form of a plate which is formed of a metal or synthetic resin is disposed adjacent to the reflector 2, and has a length which is substantially equal to the length of the platen. The auxiliary guide 19 is carried by a holding member 20, one end of which is secured to a rotary shaft 21. The auxiliary guide 19 is disposed in its phantom line position shown in FIG. 4 only for a given time interval so as to guide the leading edge of the paper 3 into the nip between the roller 15 and the platen 1 as it is fed from the deflector 2.

The platen 1 has a rotary shaft 1*a*, one end of which fixedly carries a belt pulley 22 as shown in FIG. 5. The motor 23 is disposed adjacent to the pulley 22, and has a drive shaft 23*a* on which a belt pulley 24 is mounted. A timing belt 25 extends around the both pulleys 22, 24, whereby the drive from the motor 23 is transmitted to the rotary shaft 1*a* of the platen 1 to cause it to rotate, thus rotating the platen 1 in a direction indicated by an arrow e. It will be seen that the motor 23, the pulleys 22, 24 and the belt 25 constitute together drive means which rotates the platen 1.

A pair of knobs 26 are fixedly mounted on the opposite ends of the rotary shaft 1*a*. When the motor 23 does not drive the platen 1, either knob 26 may be rotated by a finger to rotate the platen 1.

Figure 6:
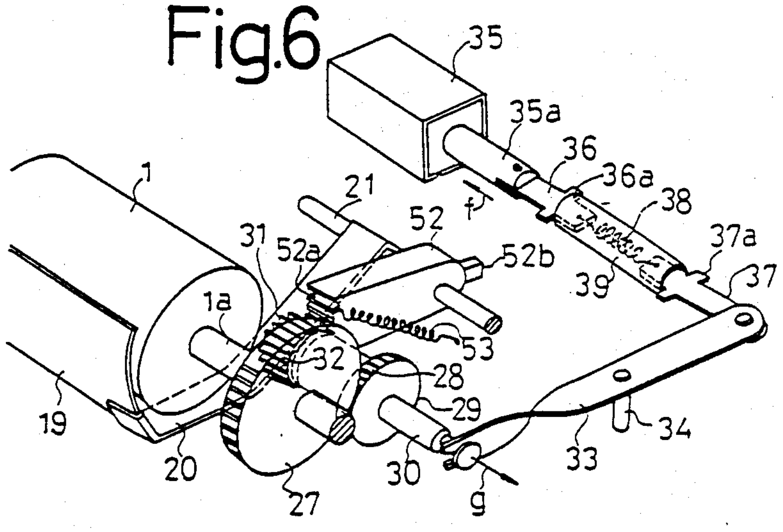
FIG. 6 is a perspective view of an auxiliary guide drive system of the embodiment shown in FIGS. 1*a* and 1*b*.

Referring to FIGS. 5 and 6, it will be noted that a gear 27 is fixedly mounted on the rotary shaft 1*a*. A rotatable cylinder 28 is disposed adjacent to the gear 27, and is rotatably supported by a bearing, not shown. On its outer periphery, the cylinder 28 fixedly carries a gear 29 which in turn meshes with the gear 27. A sliding shaft 30 is slidably disposed inside the cylinder 28 and the gear 29, and a gear 31 is rotatably mounted on the sliding shaft 30. A portion of the gear 31 which is disposed opposite to the cylinder 28 has a clutch plate 32 secured thereto.

The end of the sliding shaft 30 is connected to a forked end of a swinging lever 33, which is pivotally mounted on a pin 34 intermediate its length. A solenoid 35 is disposed adjacent to the swinging lever 33 and has an actuator rod 35*a*, to which a fastener 36 is connected in a rotatable manner. Another fastener 37 is connected to an end of the swinging lever 33, located nearer the solenoid 35, also in a rotatable manner. The both fasteners 36, 37 are connected together by a tension spring 38. Each of the fasteners 36, 37 is formed with a pair of lateral projections 36*a*, 37*a*, and a sleeve 39 is disposed to surround part of the fasteners 36, 37 and the spring 38. Unless a force in excess of a given value is applied to the spring 38, the tension of the spring 38 maintains the projections 36*a*, 37*a* extending from the fasteners 36, 37 in abutment against the opposite edges of the sleeve 39.

The solenoid 35 has a coil 35*b* which when energized, drives the actuator rod 35*a* in a direction indicated by an arrow f as viewed in FIG. 6, and the resulting movement of the actuator rod 36*a* is transmitted to the swinging lever 33 through the combination of the fasteners 36, 37 and the spring 38, whereby the swinging lever 33 undergoes a swinging motion to cause a sliding movement of the sliding shaft 30 in a direction indicated by an arrow g. As the shaft 30 slides in the direction of the arrow g, the clutch plate 32 which is integral with the gear 31 is brought into abutment against the rotatable cylinder 28, and the force of friction acting between the clutch plate 32 and the cylinder 28 causes the rotation of the gear 29 to be transmitted to the gear 31 for rotating it.

When the coil 35*b* of the solenoid 35 is energized to drive the actuator rod 35*a* in the direction of the arrow f, the swinging lever 33 undergoes a swinging motion to cause the shaft 30 to slide in the direction of the arrow g to bring the clutch plate 32 into engagement with the cylinder 28, as mentioned previously, and in addition, the actuator rod 35*a* is driven through a further given distance to cause an elongation in the spring 38, to move the fastener 36 so that the projections 36*a* thereof is spaced a given distance from the sleeve 39. Accordingly, the clutch plate 32 is maintained in abutment against the rotatable cylinder 28 under the tension supplied from the spring 38.

When the solenoid 35 is deenergized, a spring, not shown, returns the actuator rod 35*a* to its original position, whereby the sliding shaft 30 moves in a direction opposite from that indicated by the arrow g, causing the clutch plate 32 on the gear 31 to be disengaged from the cylinder 28 to interrupt the transmission of rotation from the gear 29 to the gear 31.

As shown in FIGS. 4 and 5, a rotatable block 52 is disposed adjacent to the gear 31, and is fixedly mounted on the rotating shaft 21 to which one end of the holding member 20 which carries the auxiliary guide 19 is secured. The peripheral edge of the block 52 is formed with teeth 52*a* which are adapted to mesh with the gear 31. Accordingly, as the gear 31 rotates, its rotation is transmitted to the block 52, whereby the rotating shaft 21 is rotated, in turn rotating the holding member 20 secured thereto and the auxiliary guide 19 carried thereby.

As the auxiliary guide 19 moves close to the roller 15 as a result of rotation of the block 52 which occurs in response to the rotation of the gear 31, a further rotation of the block is prevented by a stop 52*b*, which extends in the opposite direction from the pheripheral edge in which the teeth 52*a* are formed, abutting against the stationary member 7. In this manner, the auxiliary guide 19 is positioned properly where it is disposed at a small spacing from the platen 1.

When the abutment of the stop 52*b* against the stationary member 7 has interrupted the rotation of the block 52 and when the solenoid 35 is energized to bring the clutch plate 32 on the gear 31 into abutting relationship with the rotatable cylinder 28, the rotation of the gear 29 merely results in a slip between the clutch plate 32 and the cylinder 28, preventing the gear 31 from rotating.

As a result of the described arrangement, when the solenoid 35 is energized, the rotation of the platen 1 is transmitted to the gear 31 which causes the block 52 to rotate clcokwise, as viewed in FIG. 4, to raise the auxiliary guide 19 to its phantom line position shown in FIG.

4, and the roller 15 is moved away from the platen 1. When the solenoid 35 is deenergized, the block rotates counter-clockwise, as viewed in FIG. 4, whereby the auxiliary guide 19 returns to its position shown in solid line in FIG. 4, and the roller 15 is returned into contact with the platen 1. The switch 54 becomes open as the roller 15 moves away from the platen 1, and the switch 54 is closed when the roller 15 is brought into contact with the platen 1.

Figure 8A:
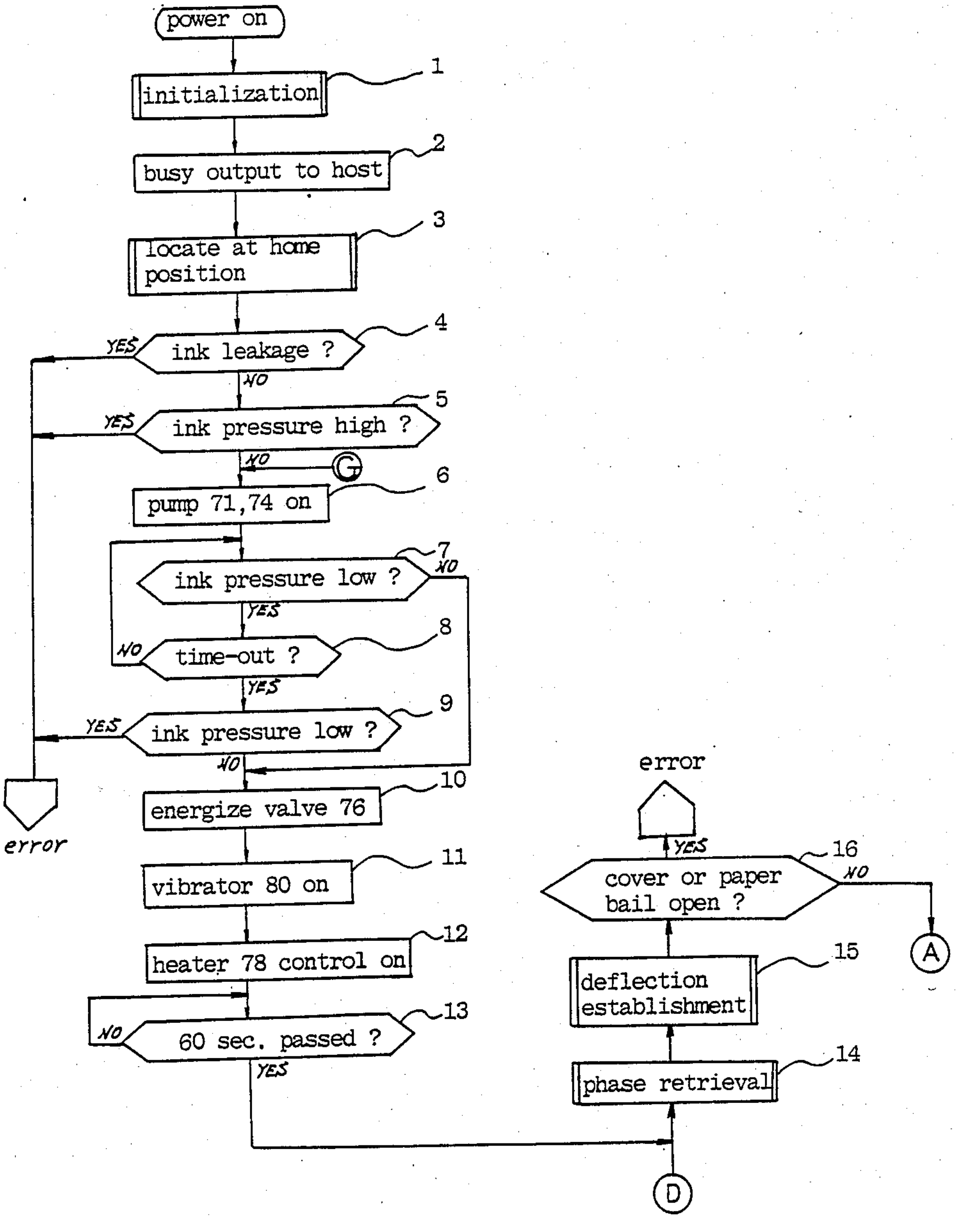
FIGS. 8*a*, 8*b*, 8*c*, 9*a*, 9*b*, 9*c*, 10*a*, 10*b*, 11 and 12 charts representing the operation of microprocessors contained in the electrical control shown in FIGS. 1*a* and 1*b* to control the projection of an ink jet and a printing or a recording operation.
Figure 8B:
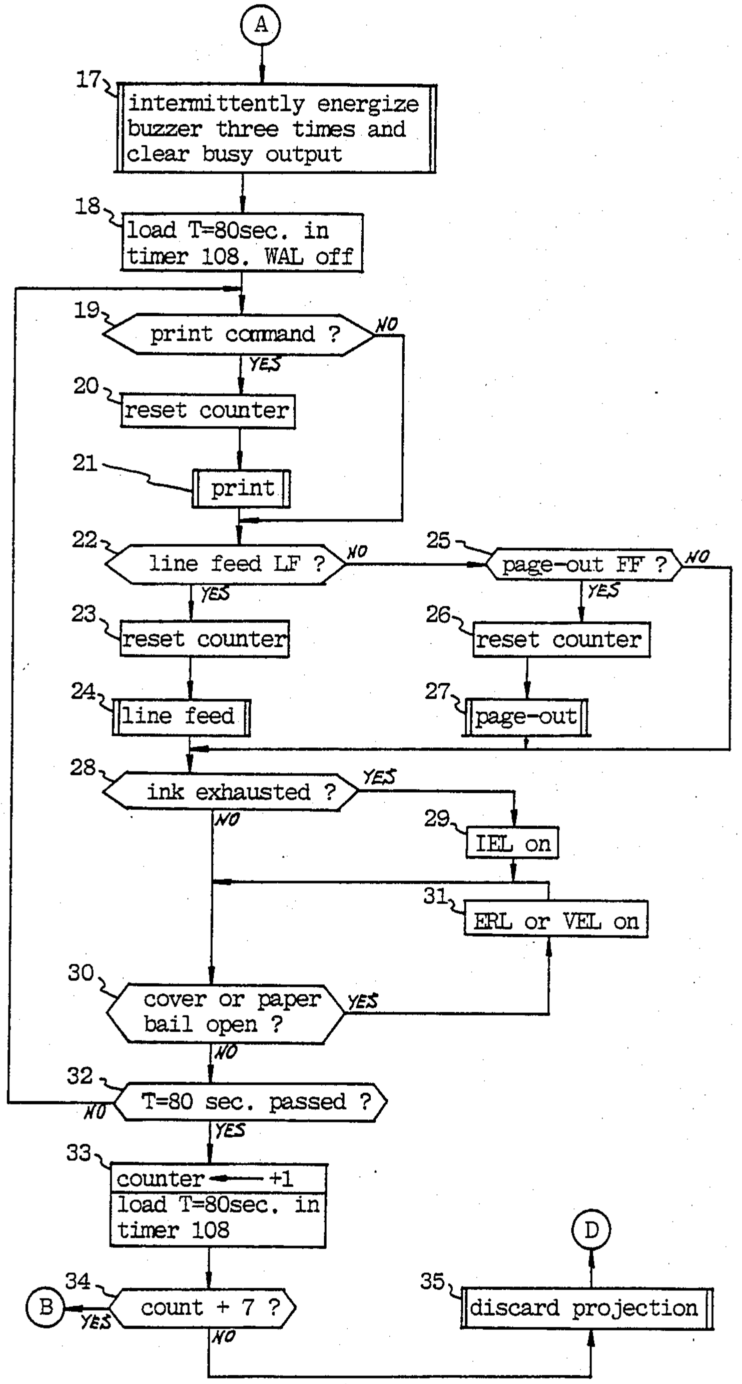
Figure 8C:
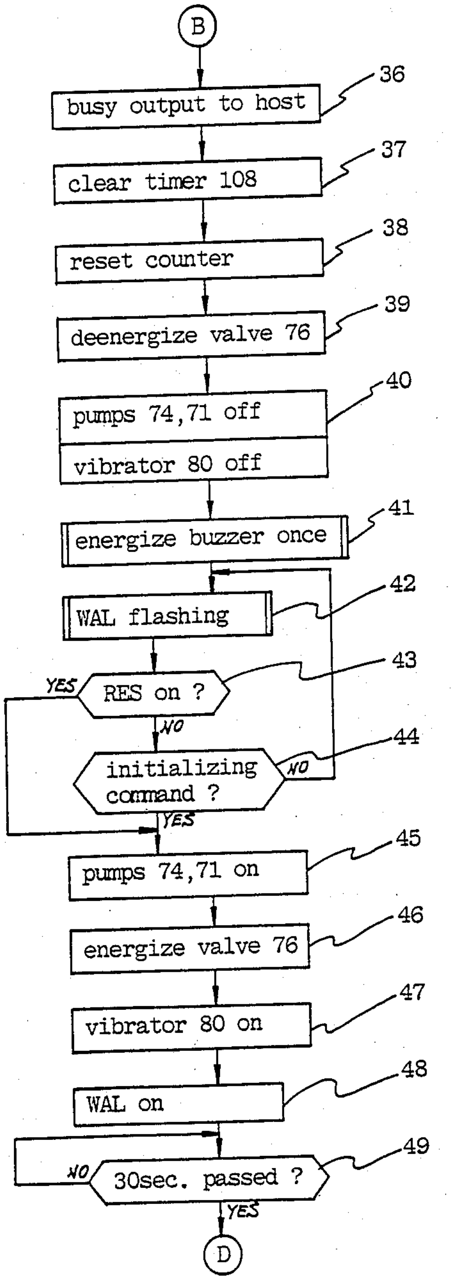

FIGS. 8*a*, 8*b* and 8*c* are flow charts illustrating a control operation by the print controller 102. It is to be understood that the data transfer controller 91 reads the status on the operating board 90, transfers status data to the controller 102, loads display data supplied from the controller 102 into the operating board 90, receives data to be printed and control signals from the host unit HTC and transfers status data to the host unit HTC. It is to be noted that the print controller 102 causes a reading of the status relating to the operating board 90 and a control of the display to be performed by the data transfer controller 91. Also, the reception and transmission of signals to or from the host unit HTC are undertaken by the data transfer controller 91.

When the power supply is turned on, the print controller 102 executes an initialization (step 1) and delivers a busy output to the host unit HTC (step 2), and locates the carriage at its home position (step 3).

A reference is then made to an output of the ink detector circuit which is connected to the electrodes 85, 86 (step 4), and if the output level indicates the presence of an ink, the program then proceeds to the processing of an error. If the output level indicates the absence of an ink, the program proceeds to set "interruption able" (step 5) for allowing a high pressure control in accordance with the L level (high pressure detection) from the high ink pressure detector circuit which is connected to the pressure sensor 83 then a command is issued to a pump driver (step 6) which drives the pump 74 (ink pressure pump) and the pump 71 (ink recovery pump), and a given time interval is set in a program timer, and a reference is made to an output from the low ink pressure detector circuit which is connected to the pressure sensor 84 (step 7), thus waiting for the ink pressure to rise. If the output from the low ink pressure detector circuit ceases to indicate the low pressure before the timer times out (step 9), the solenoid operated switching valve 76 is energized (step 10). If the timer times out while the output of the low ink pressure detector circuit indicates the occurrence of the low pressure, the program proceeds to the processing of an error. When the switching valve 76 is energized (step 10), the application of an exciting voltage to the electrostrictive vibrator 80 is initiated (step 11), and an on control output is delivered to the heater control circuit, and 60 sec timer is started (step 12).

The described control operation causes an ink jet to be projected from the head 61, and the projected ink stream is periodically separated into ink particles substantially at the center of the charging electrode 62, whereby the ink particles impinge upon the gutter. The print controller 102 then waits for the 60 sec timer to time out under this condition. Upon time-out, a phase retrieval is executed (step 14). During the phase retrieval, a charging voltage is applied to the charging electrode without applying deflecting voltages to the deflecting electrodes 63, 64. The phase of the charging voltage is sequentially shifted until the charge detector circuit connected to the gutter 65 produces a signal which indicates the presence of a charge. If the presence of a charge is detected during the phase retrieval, the prevailing phase of the charging voltage represents an optimum charging phase, and hence a charging voltage applied to the electrode 62 is centered about that phase until the next phase retrieval is effected.

Upon completion of the phase retrieval, an amount of deflection is established (step 15). At this time, the carriage is located at its home position, and a standard charging voltage which should cause the maximum deflection is applied to the electrode 62. A reference is made to an output from the charge detector circuit which is connected to the electrode 67, and as long as the output does not indicate the presence of a charge, the magnitude of the charging voltage is reduced in an decremental manner until the presence of a charge is detected. Thereafter, the magnitude of the charging voltage continues to be increased in an incremental manner until the indication changes from thepresence to the absence of a charge. Thereupon, the prevailing magnitude of the charging voltage is read, and a difference between this magnitude and the standard voltage is calculated to determine an amount of correction. In this manner, the charging voltage to be applied in each deflection step if a printing operation is determined.

When the amount of deflection is established, the status of the switches 88, 54 is read. if the printer cover is open or the roller 15 is spaced from the platen 1 (paper bail open), the program proceeds to the processing of an error (step 16). When the printer cover is closed and the roller 15 is in contact with the platen 1, the system is ready to initiate a printing operation. Hence, a buzzer BZ is intermittently energized three times, clearing a busy output delivered to the host unit (step 17), and a time limit T=80 sec is loaded into the timer 108, which is then started. The standby lamp WAL is deenergized. It is to be noted that the standby lamp WAL has been energized at step 1 of the initialization.

Data to be printed and a command are then transferred from the host unit HTC, thus proceeding to a print control step 21. Specifically, when data to be printed and a command are supplied from the host unt HTC, the program initially determines if a print command is received (step 19) and if it is yes, resets or clears a counter (register) which stores data to be used in a decision to interrupt the projection of an ink jet (step 20), and then execute a print operation (a recording operation based on the supplied data to be printed) (step 21). Upon completing a printing of data to be printed (normally corresponding to one line), the program then waits for another supply of data to be printed and a command. If a line feed command LF is supplied from either the operating board 90 or the host unit HTC (step 22), the counter is reset, and a line feed operation is executed, namely, the paper is fed by a distance corresponding to the one line spacing (step 24). If a page-out command FF is supplied (step 25), the counter is reset (step 26) and a page-out operation or the delivery of a paper is executed (step 27). After these executions or in the absence of any command therefor, a reference is made to an output from the ink level detector circuit which is connected to the electrode 82 (step 28), and if the absence of an ink is indicated, an energization of the idicator lamp IEL is set (step 29). Subsequently or if the presence of an ink is indicated, a reference is made to status signals from the switches 88 and 54, and an energization of the indicator lamp ERL is set when the print cover is open while an energization of the indicator lamp VEL is set when the roller 15 is away from the platen 1, and a busy output to the host unit is delivered (step 31). Then the system remains in a condition projecting an ink jet until the cover is closed and the roller 15 is closed or brought into contact with the platen 1 (step 30).

It will be seen that the projection of an ink jet is not subject to a time limit, but is continued until both the printer cover the roller 15 assumes their closed positions for the second time subsequent to opening the printer cover or opening the roller 15 immediately after energizing the buzzer BZ three times (step 17) after closing the printer cover and moving the roller 15 to its closed position and turning on the power to the printer to initiate the projection of an ink jet. Accordingly, when an operator desires to perform an aging projection of an ink jet over a prolonged length of time as may be necessary after moving about the printer, he may close the printer cover, bring the roller 15 to its closed position and turn the power supply to the printer on to start the projection of an ink jet in a normal manner, and may open the printer cover or bring the roller 15 to its open position after the buzzer BZ has been energized three times (step 17). After the termination of a desired aging projection, the printer cover may be closed and the roller 15 may be moved to its closed position.

When the printer cover remains closed and the roller 15 remains at its closed position since the power is turned on or when both the printer cover and the roller 15 assume their closed positions for the second time subsequent to opening either the printer cover or the roller 15 immediately after the buzzer BZ has been energized three times (step 17) after initiating the projection of an ink jet by closing the printer cover, bringing the roller 15 to its closed position and turning on the power supply to the printer, the program proceeds to a next step 32 to see if the timer which has been loaded at step 18 has timed out. If the timer has not timed out, a busy output to the host unit is cleared, and the program waits for a print command at step 19, or waits for the supply of data to be printed and any command. When data to be printed and a command are supplied including a print instruction (step 19), the counter is reset again (step 19).

If it is found at step 32 that 80 sec timer has timed out, the counter is incremented by one, and a time interval of 80 sec is again loaded into the timer 108, which is then started (step 33). A reference is made to the content of the counter. If the counter has a count of 7, this means that none of a print command, a line feed command LF or a page-out command FF has been supplied during a given time interval which is equal to $7\times80$ sec $=560$ sec. Druing such time interval, the projection of an ink jet has been continued. Hence, the program proceeds to a step 36 where the projection of an ink jet is interrupted.

If the counter does not have a count of 7, this means that a length of time which necessitates the interruption of the projection of an ink jet has not passed, and hence the projection of an ink jet is continued. However, as mentioned previously, the phase retrieval, the establishment of the amount of deflection and the discard of a given amount of ink take place at an interval of substantially 80 sec. Accordingly, the carriage is located at its home position to perform the phase retrieval (step 14), the establishment of the amount of deflection (step 15) and the projection of an ink jet for an interval of 2.5 sec (step 35). During the projection of an ink jet for the interval of 2.5 sec at step 35, a voltage is applied to the charging electrode in order to charge ink particles so that they impinge upon the lower surface of a partition 68 (see FIG. 3). When these steps are complete, the program proceeds through the steps 16, 17 and 18 and then waits for the supply of data to be printed and command. When such data and command are supplied, the counter is reset (step 20) and the print operation is executed (step 21). During the time the program waits for the supply of data to be printed and a command, it proceeds to the step 22 and following steps.

When the program waits for the supply of data to be printed and a command for a given time interval ($7\times80$ sec), or when data to be printed and a command including a print command, a line feed command, or a page-out command are not supplied from either the host unit or the operating board during the given time interval, the program proceeds from the step 34 to a step 36 when the counter reaches a count of 7 or when the time interval equal to $7\times80$ sec has passed. The program then delivers a busy output to the host unit, clears the timer 108 (or intrrupt the time limit operation) (step 37), clears the counter (step 38), deenergizes the switching valve 76 (step 39) and deactivates the pumps 74 and 71 and ceases the operation of the vibrator 80 (step 40). Then it energizes the buzzer BZ only once (step 41), sets up the standby lamp WAL for a flashing operation (step 42), and then waits for an ink jet projection command, produced by closing the reset switch RES at the operating board 90 (step 43) or waits for an initializing command from the host unit (step 44). In other words, the system interrupts the projection of an ink jet and waits for an ink jet projection command from either the operating board 90 or the host unit HTC.

The operator is informed about the automatic interruption of the projection of an ink jet by sounding the buzzer BZ only once and is also informed about that the projection of an ink jet is being interrupted by a flashing operation of the standby lamp.

If the reset switch RES on the operating board 90 is closed or an initializing command is produced by the host unit during the time the projection of an ink jet is interrupted, the program proceeds from either step 43 or 44 to a step 45 where the pumps 74 and 71 are set up to be driven. The energization of the switching valve 46 is set up (step 46), the excitation of the vibrator 80 is set up (step 47), the standby lamp WAL is set for continuous energization (step 48) and a 30 sec timer is started. When the 30 sec timer has timed out, the program proceeds to the phase retrieval at step 14.

It will be understood that by the described control operation, when either the reset switch RES is closed or an initializing command is produced by the host unit subsequent to the interruption of the projection of an ink jet, the projection of an ink jet is re-initiated, and the phase retrieval and the establishment of the amount of deflection are initiated 30 sec later. When these steps are complete, the buzzer BZ is sounded three times. The printing operation is then enabled.

The control operation described above can be summarized as follows:

(1) When the power supply to the printer is turned on, the projection of an ink jet is initiated, and the printing operation is enabled substantially 80 sec after the initiation of the ink jet. The fact that the printing operation is enabled is informed by sounding the buzzer three times. The projection of an ink jet is continued as long as data to be printed and a control command are supplied within a time interval which is substantially equal to 7×80 sec, and the phase retrieval, the establishment of the amount of deflection and discharging ink projection for an interval of 2.2 sec are repeated at a period of substantially 80 sec. The standby lamp WAL is continuously energized or illuminated until preparations for the printing operation are complete.

(2) If data to be printed and a control command are not supplied within a time interval which is substantially equal to 7×80 sec since the printing operation is ready (indicated by sounding the buzzer three times) or after the termination of the previous printing operation, the projection of the ink jet is automatically interrupted. However, a control over the ink temperature is continued during such interruption. The buzzer is sounded once when the projection of the ink jet is interrupted, and the standby lamp WAL flashes as long as the projection of the ink jet is being interrupted.

(3) When the reset switch RES is closed or an initializing command is produced by the host unit during the time the projection of an ink jet is being interrupted, the projection of the ink jet is re-initiated. It will be seen that in this instance, the preparation for the printing operation will be complete in an interval (30 sec) which is less than the interval (60 sec) required for the printing operation to be ready immediately after the power supply to the printer is turned on. The standby lamp WAL is continuously illuminated until the preparations for the printing operation are complete.

(4) The automatic interruption of the projection of the ink jet is inhibited by opening the printer cover or moving the roller 15 away from the platen 1 after the buzzer has been sounded three times. The projection of the ink jet is continued until the printer cover is closed *and* the roller 15 is brought into contact with the platen 1.

Figure 9A:
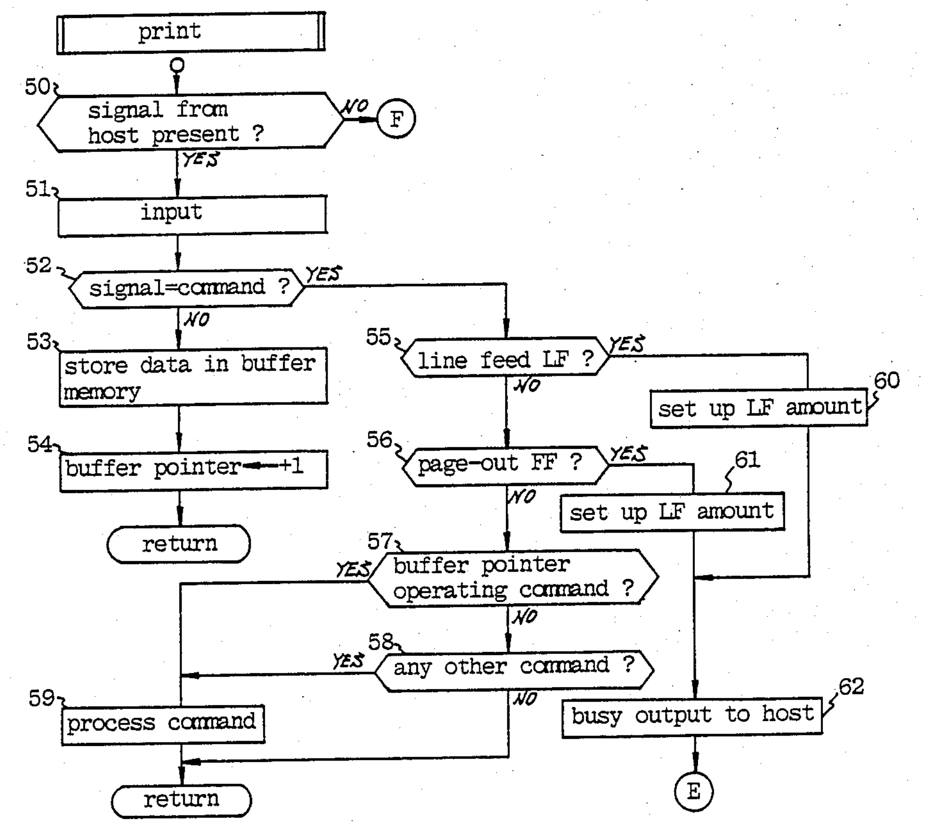
Figure 9B:
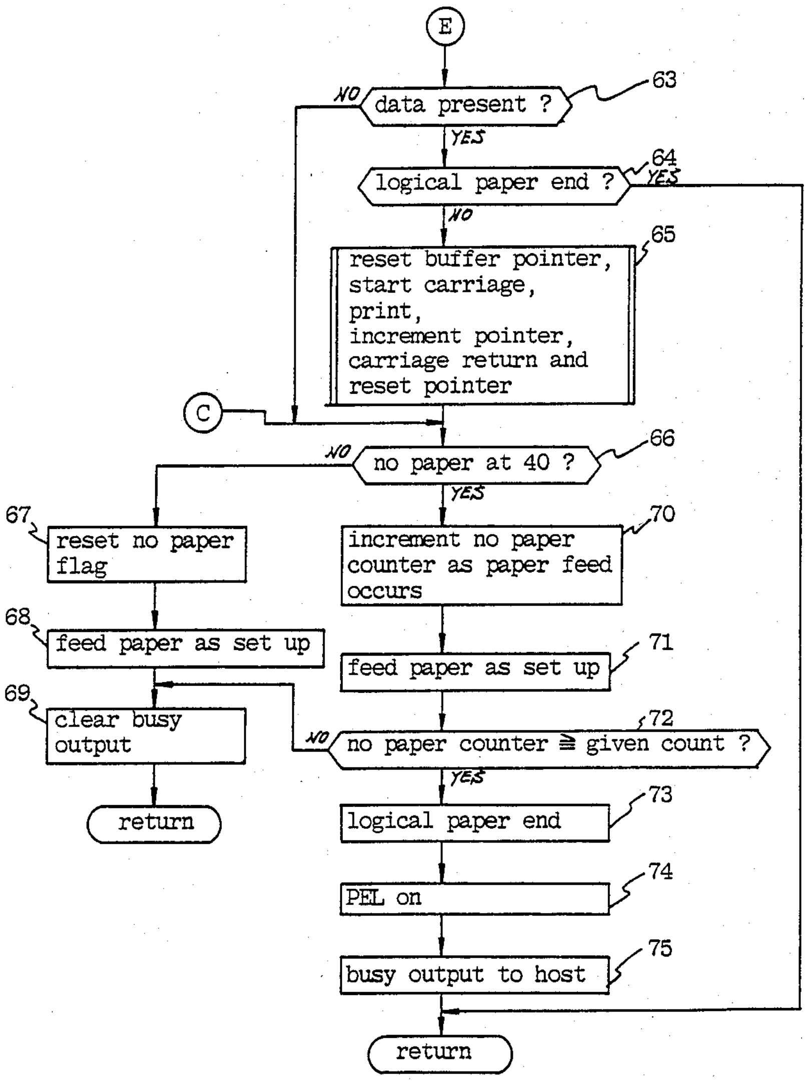
Figure 9C:
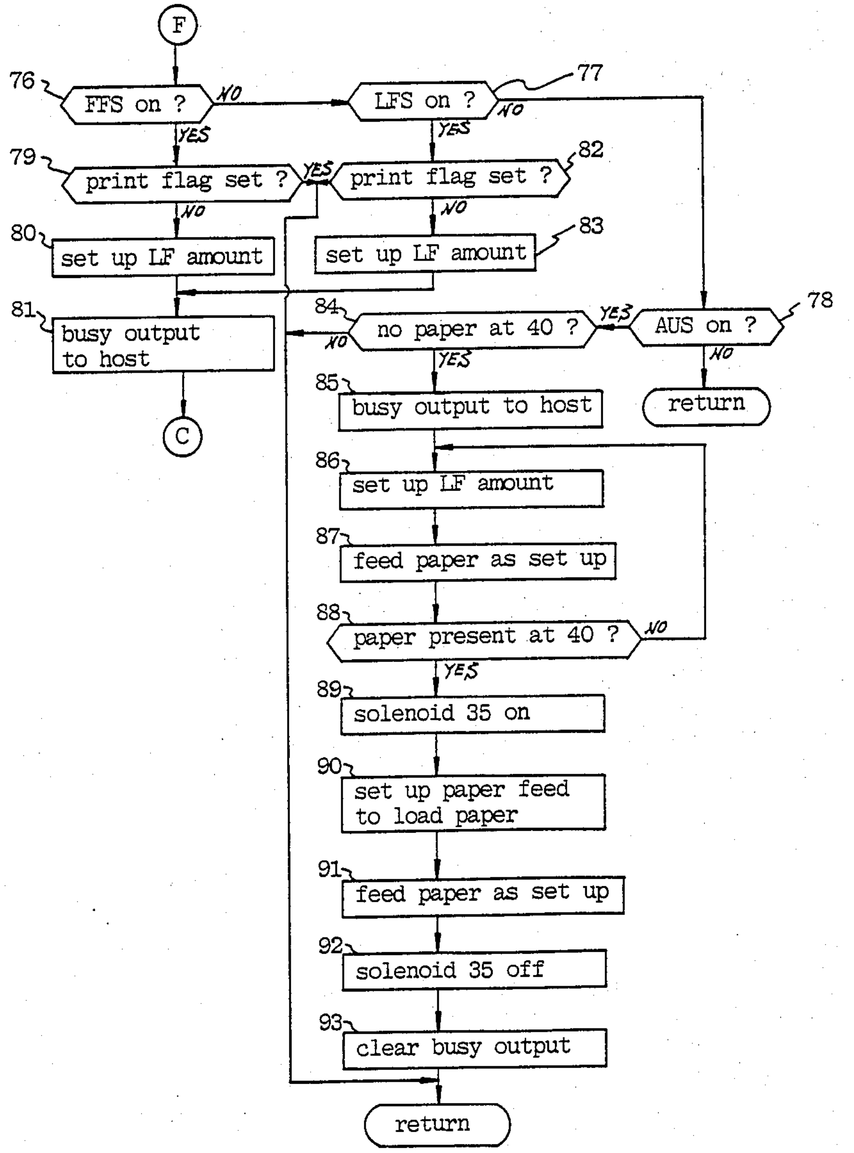

FIGS. 9*a*, 9*b* and 9*c* are flow charts illustrating a paper feed control operation during the printing operation. This control is performed by both the print controller 102 and the data transfer controller 91. If a signal is delivered from the host unit (step 50) during the time the program waits for the supply of data to be printed and a command, the signal is received. If the signal represents data to be printed, such data is stored in a data buffer (steps 51, 52, 53 and 54). If the signal represents a control command, a control operation in accordance with the command is performed. Thus, a line feed operation takes place in response to a line feed command, a paper deliver takes place in response to a page-out command, and any other control is executed in accordance with other command (steps 55 to 59). The control of a line feed and a paper delivery will now be described.

In response to a line feed command, the program proceeds from the step 55 to a step 60 where a paper feed corresponding to one line or a corresponding drive to be applied to the platen 1 is set up. A busy output is delivered to the host unit (step 62) and a reference to the presence or absence of next data to be printed is made (step 63). If next data to be printed is absent, a reference is made to the paper sensor 40 to see if it has detected the presence of a paper (step 66). If the paper sensor 40 has detected the presence of a paper, this indicates that a paper is disposed around the platen 1. No paper flag, indicating the absence of a paper at the location of the sensor 40, is cleared (step 67), and the platen 1 is driven through an amount corresponding to the paper feed which is established at either step 60 or 61 (step 68), and the busy output to the host unit is cleared.

If no paper is present at the location of the paper sensor 40, a reference is made to the no paper flag, and if it is reset, the flag is set. The platen is driven through an amount corresponding to the paper feed set up while incrementing a no paper counter which counts the amount of paper feed since the no paper flag has been set (step 71). The content of the no paper counter is compared to a given fixed value which represent the amount of paper movement required for the trailing edge of the paper to leave the roller 5 after it has left the paper sensor 40. If the count is less than this value, the printing operation is still possible, thus clearing the busy output or flag supplied to the host unit (step 69). If the count is equal to or greater than the given value, it is no longer possible to effect a printing operation, and hence a logic paper end flag is set (step 73), an energization of no paper indicator lamp PEL is set up, and a busy output to the host unit is set.

If it is found at step 63 that next data to be printed is present, a reference is made to the logic paper end flag, and if it is reset, indicating that the printing operation is possible, the printing operation is controlled at step 65. Upon completion thereof, the program repeats the detection of paper and the processing operation which begin with the step 66.

If it is found at step 50 that no signal is supplied from the host unit, the switch status on the operating board 90 is read. If the page-out command switch FFS is closed (step 76), a reference is made to a print flag. The print flag is set when a printing operation based on data to be printed is initiated, and is cleared or reset upon completion of the printing operation. It is a flag which indicates "initiating and terminating the reception of a signal from the host unit and the termination of a given task in accordance with a command contained in the signal" during the printing operation. If the flag is set, the page-out operation is impossible since the platen 1 will be marred if the page-out operation occurs under this condition. Accordingly, the program returns to the main routine (FIG. 8*b*), waiting for the completion of a printing operation.

If the print flag is reset, an amount of paper feed required for a page-out or paper delivery is set up (step 80), a busy output to the host unit is set (step 81) and then the program proceeds to the step 66. It proceeds from the step 66 through steps 67, 68, 69, thus returning to the main routine. The program also proceeds from the step 50 of FIG. 9 through the steps 76, 79, 80, 81 and 66, and when the sensor 40 has detected the absence of a paper, it proceeds through the steps 66, 70, 71, 72 and 69, thus returning to the main routine. Also the program proceeds from the step 50 of FIG. 9 through the steps 76, 79, 80, 81 and 66, and also through the steps 70, 71 and 72, and when the content of the no paper counter exceeds the given value (or when the trailing edge of the paper around the platen 1 has left the roller 5), it then proceeds to the steps 73 to 75, thus ceasing the paper feed operation. The paper which has been delivered out of the platen 1 at the time the paper feed operation ceases can be taken out of the platen 1 by raising the roller 15. The no paper lamp PEL is illuminated under the condition that the paper delivery has been completed in this manner.

If the line feed command switch LFS is closed (step 77), a reference is made to the print flag, and if it is reset, a paper feed corresponding to one line is set up(step 83), and the program proceeds to the steps 81 to 66. it is to be noted that when the switch LFS is closed, a paper feed by one line is executed at the time the switch transitions from its open to closed condition, and the paper feed is not repeated again until the switch LFS returns to its open condition from its closed condition.

When loading a paper around the platen 1, the operator inserts the paper along the guide 2 until it reaches the roller 4, and then manually turns the knob 26 (manual loading) or closes the automatic paper load command switch AUS (automatic paper loading). When the automatic paper load command switch AUS is closed (step 78), a reference is made to the paper sensor 40 if it has detected the presence of a paper. If the sensor 40 has detected the presence of a paper, a previous paper is disposed around the platen 1, and hence no paper feed operation takes place. If the sensor 40 has not detected the presence of a paper, a busy output to the host unit is set (step 85), and a given amount of paper feed is set up (step 86), and the platen 1 is driven to perform a paper feed by an amount which has been set up (step 87). This allows the inserted paper to be fed in a direction toward the paper sensor 40 from the roller 4. A reference is then made to an output from the paper sensor 40, and an amount of paper feed is set up (step 86) and the platen 1 is driven in accordance therewith (step 87) until the paper sensor 40 produces a signal indicating the presence of a paper. When the paper sensor 40 has detected the presence of a paper, indicating that the leading edge of the inserted paper has reached the location of the paper sensor 40, an energization of the solenoid 35 is set up in order to feed the paper until it reaches the roller 15 (step 89). This allows the auxiliary guide 19 to be raised to its phantom line position shown in FIG. 4, and causes the lever 14 to be rotated counter-clockwise, whereby the roller 15 is moved away from the platen 1.

An amount of drive which must be applied to the platen to feed the paper such that the leading edge thereof is conveyed from the location of the sensor 40 to a location immediately below the roller 15 is set up (step 90), and the platen is driven accordingly (step 91). The solenoid 35 is then turned off (step 92). At this time, the leading edge of the paper is pressed against the platen 1 by the roller 15, and the auxiliary guide 19 has been lowered to the solid line position shown in FIG. 4 (standby mode). The busy flag supplied to the host unit is then cleared (step 93), and the program returns to the main routine (FIG. 8), waiting for the supply of data to be printed and a command from the host unit.

The paper feed control described above can be summarized as follows:

(5) When no paper is loaded around the platen 1, the operator inserts the paper until it reaches the roller 4, and then closes the automatic paper load command switch AUS. Thereupon, the platen 1 is initially driven, whereby the paper is fed inward toward the paper sensor 40. When the paper sensor 40 detects the leading edge of the paper, the selenoid 35 is energized, whereupon the auxiliary guide 19 is raised and the roller 15 is driven away from the platen 1. The paper feed or the drive to the platen is continued until the leading edge of the paper reaches the location immediately below the roller 15, whereupon the solenoid 35 deenergized to cease the drive applied to the platen 1 and to lower the auxiliary guide 19, thus allowing the leading edge of the paper to be pressed against the platen 1 by the roller 15.

(6) When data to be printed and a command are supplied from the host unit, a printing operation for such data and a paper feed operation take place. The printing operation based on such data and an associated paper feed operation are repeated each time data to be printed and a command are supplied. During such operation, if the paper sensor 40 detects the absence of a paper, indicating that the trailing edge of the paper has passed through the location of the paper sensor 40, the no paper counter counts up an amount of paper feed which has taken place since the absence of a paper is detected. When such amount of paper feed determined by the counter reaches a value which corresponds to the paper length extending between the paper sensor 40 and the roller 5 or when the trailing edge of paper has left the roller 5, the no paper indicator lamp PEL is illuminated, and the initiation of the printing operation is disabled. Under this condition, the operator removes the paper from the platen 1 and loads a fresh paper into the guide 2 and then closes the automatic paper load switch AUS. A control operation as mentioned in the paragraph (5) then takes place.

(7) A line feed, a page-out or an automatic paper loading operation which may be instructed by an operation of manual key switches on the operating board 90 is not executed since the initiation of reception of data to be printed and a command from the host unit until the end of the printing operation for such data or until the end of a task instructed by the command. A task instructed by a manual key switch operation is executed during the standby mode during which a signal from the host unit is being waited for.

(8) It is impossible to detect the leading and the trailing edge of the paper with the sensor alone. Hence, the position of the leading end of the paper as well as the printing position are determined by calculating the amount of paper feed logically has occurred since the sensor has detected the leading edge of the paper. Similarly, the position of the trailing edge of the paper is determined by logically calculating the amount of paper feed which has occurred since the sensor has detected the trailing edge of the paper. As a result, if the paper which has once been loaded around the platen 1 is pulled back in a direction opposite from the direction of insertion, the actual location of the paper will be different from that which is determined logically, thus upsetting the automatic paper loading. To accommodate for this, the automatic paper loading operation is controlled on the basis of a detection of an actual condition by the paper sensor 40. The automatic paper loading is invalidated as long as the paper is being detected by the paper sensor 40. However, when no paper is detected by the sensor, the automatic paper loading is enabled if the paper is actually loaded around the platen 1 or if its trailing edge is located between the sensor 40 and the roller 15, thus allowing a fresh paper to be automatically loaded around the platen. In this instance, the old paper is delivered out of the platen by the automatic paper loading operation. It will be seen that because the automatic paper loading operation is enabled or disabled by a condition detected by the paper sensor 40, an inadvertent operation of the switch AUS during the time the trailing edge of the paper is located between the sensor 40 and the roller 5 and a printing operation is taking place may result in the paper being delivered, whereby the platen 1 will be marred by the ink. The operation described in the paragraph (7) is designed to prevent this.

Figure 10A:
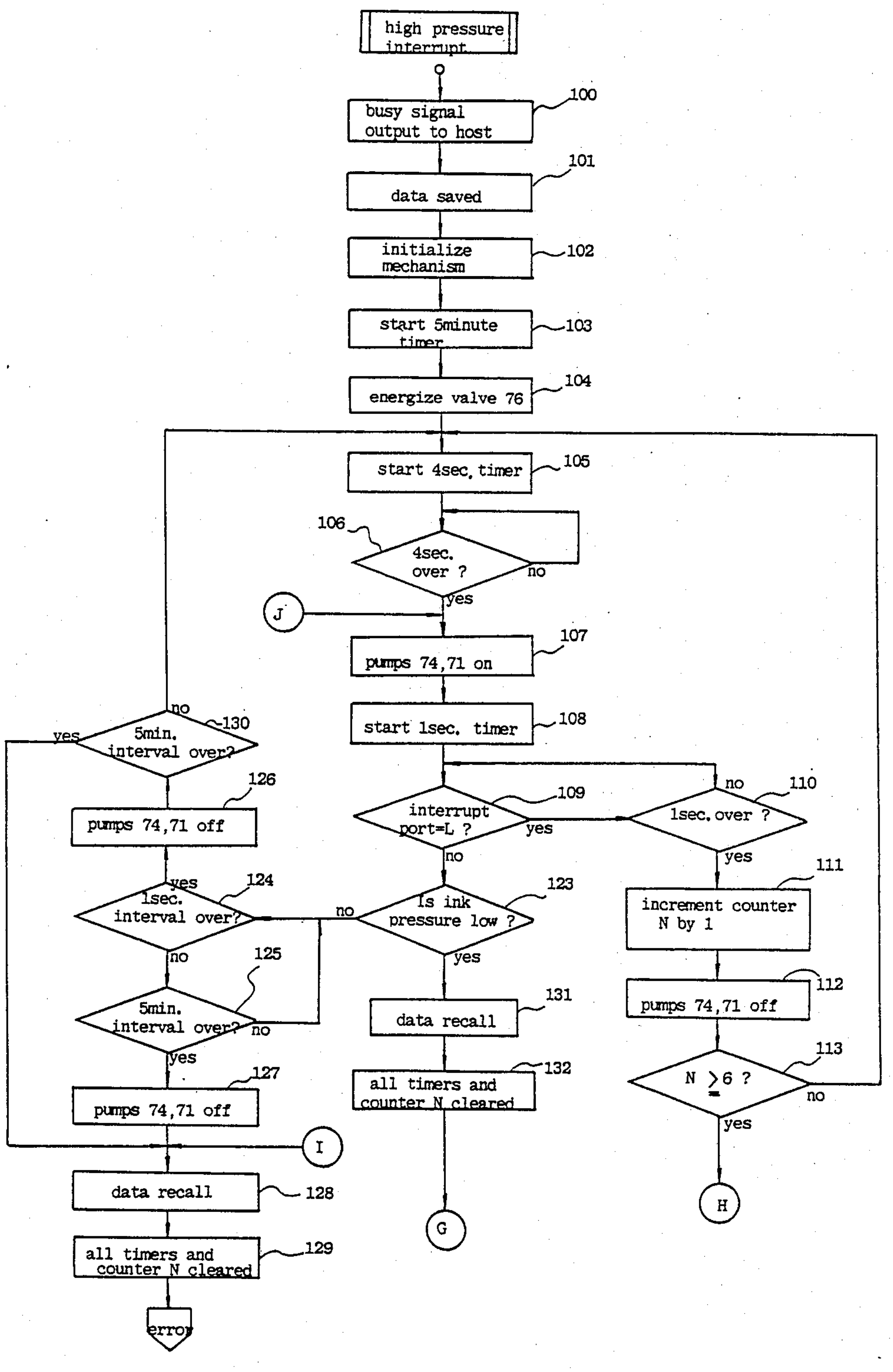
Figure 10B:
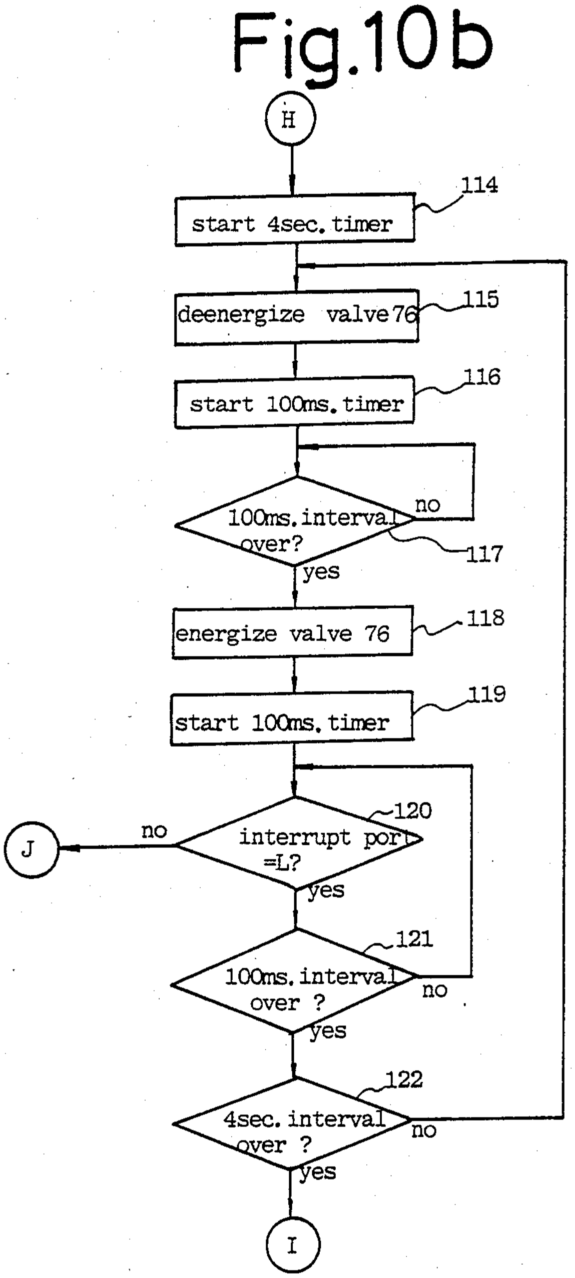

The control of the ink pressure which takes place when the ink pressure sensor 83 has detected a high ink pressure and the high ink pressure detector circuit has developed an interrupt signal of L level is illustrated in the flowcharts of FIGS. 10*a* and 10*b*.

When the high ink pressure detector circuit produces an output of L level, the print controller 102 effects a control operation initiated by an interrupt, as indicated in FIG. 10*a*. This control represents a control over the ink pressure which comprises three stages in this embodiment, including a first stage in which the drive to the pump is controlled in an on/off manner with a duty cycle of 20%, a second stage in which the ink pressure is caused to be released if the ink pressure does not decrease from its "high pressure" in response to the on/off control, and a third stage in which the pump is driven in an on/off manner with a duty cycle of 20% when the ink pressure has decreased from "high pressure" as a result of the ink pressure release, but has not reduced to a given low pressure. In each stage of such control, if the ink pressure reduces to a given low pressure which is detected by the low ink pressure detector circuit to develop an output of L level, the program exits from the flowchart to return to the main routine (FIG. 8) where the pump is driven continuously. If the high pressure condition again happens, another interrupt is produced to initiate the control over the ink pressure. When the ink pressure is not reduced to a given low pressure within a period of five minutes since the initiation of the interrupt control operation or during the control over the ink pressure, the system regards this as a serious plugging condition, and therefore, ceases to drive the pump, and activate an alarm to cause the shutdown of the printer. The control over the ink pressure will now be described in more detail.

When the control over the ink pressure is initiated or when an interrupt signal is produced, a busy signal is output to the host unit HTC (step 100), and data which is then stored in the accumulator is saved in RAM (step 101), the mechanism is initialized or set up for the standby mode (step 102). The pumps 74, 71 are turned off and the solenoid valve 76 is deenergized. The five minutes timer is started (step 103), and the solenoid valve 76 is energized (step 104) and four seconds timer is started (step 105), waiting for the timer to time out. Accordingly, during the time interval of four seconds, the pumps 74, 71 are deactivated. After the four seconds have passed (step 106), the pumps 74 and 71 are driven (step 107), and one second timer is started (step 108), waiting for this timer to time out (steps 109 and 110). During such time interval, the signal level at the high pressure interrupt port or the output from the high ink pressure detector circuit is checked. As long as the signal level is at L, the program wait for the time-out of the one second timer. If the signal level changes to H level or the ink pressure has decreased from "high pressure", the program then proceeds to step 123 and subsequent steps, and if the ink pressure is found to be equal to a given low pressure, the program returns to the main routine (FIG. 8*a*) where the pump is driven continuously (the completion of the interrupt operation). However, if the ink pressure has not reduced to the given low pressure, the program then initiates the third stage in which the pump is driven in on/off manner with the duty cycle of 20%. If the one second timer times out while the high pressure L level prevails (step 110), the count N of the number of times counter N is incremented by one (step 111), and the pumps 74, 71 are deactivated (step 112). Thus, it will be seen that the pumps 74, 71 have been driven for a time interval of one second. The content of the number of times counter N is then examined, and if N is equal to or greater than 6, indicating six cycles of on/off pump control has been completed in which one cycle comprises a time interval of four seconds during which the pump drive is ceased, followed by another second during which the pump is driven, the program proceeds to the second stage of pressure release illustrated in FIG. 10*b*. If the count N is less than six, the program returns to the step 105. The described operation represents the on/off pump control of the first stage with the duty cycle of 20% and is performed for a maximum time of 30 seconds.

When the pressure release control of FIG. 10*b* is entered, this implies that the ink pressure remains at "high pressure" after the pump has been driven with the duty cycle of 20% for a time interval of $5\times6=30$ seconds. Accordingly, the four seconds timer is initially started (step 114), the solenoid valve 76 is deenergized to allow the head 61 to communicate with the waste liquid vessel or low pressure vessel (step 115) and 100 msec timer is started (step 116). The program then waits for this timer to time out (step 117), whereupon the solenoid valve 76 is energized (step 118) and 100 msec timer is started again (step 119). Thus, after the ink pressure is released by allowing the ink projecting head to communicate with the waste liquid vessel 81 for a time interval of 100 msec, the solenoid valve 76 is energized to cause the head to cummunicate with the accumulator 75. The signal level at the interrupt port or the output from the high ink pressure detector circuit is examined, and if it is at H level, indicating a decrease from "high pressure", the program returns to the step 107 shown in FIG. 10*a* where the pumps 74, 71 are driven to proceed to the control of the third stage. If the signal level at the interrupt port is not at H level, it is determined whether the four seconds timer has timed out at the time the 100 msec timer has timed out (step 122). If the four seconds timer has not timed out, the solenoid valve 115 is deenergized, releasing the ink pressure from the head. In this manner, the solenoid valve 76 is repeatedly deenergized to release the ink pressure for a time interval of 100 msec, followed by another interval of 100 msec during which the solenoid valve 76 is energized to connect the head with the accumulator until the ink pressure decreases from "high pressure" or the four seconds timer times out.

When the four seconds timer has timed out, this means that the ink pressure has not been released. Accordingly, the program proceeds to a step 128 shown in FIG. 10*a* where the saved data is re-loaded (step 128), all of the timers and the number of times counter N are cleared (step 129), thus proceeding to the abnormal ink pressure (high pressure) processing. During the abnormality processing, the pumps 74, 71 are deactivated and other components are rendered in their standby condition, while flashing indicator lamp WAL. The above represents the ink pressure release control of the second stage which continues for a maximum length of four seconds.

When the ink pressure has decreased from "high pressure", the program proceeds from the step 120 of FIG. 10*b* to the step 107 of FIG. 10*a* where the pump is driven (step 107), The one second timer is started (step 108) and the signal level at the interrupt port is examined (step 109). It will be seen that the signal level at the interrupt port is at H level, and hence the output from the low ink pressure detector circuit is examined to see if it is at L level, representing the lower limit (low pressure) within the given range (step 123). If the output is at L level, indicating that the ink pressure has reduced sufficiently, the data which has been saved during the interrupt operation is read out and re-loaded (step 131), all the timers and the number of times counter N are cleared (step 132), and returns to the step 6 in the main routine. In the main routine, the pump is driven continuously, and hence if the injection of the ink stream is still imperfect, the ink pressure within the head will rise, resulting in the initiation of the interrupt operation described above. If the proper projection of the ink stream is established, the program proceeds to the phase retrieval, the establishment of the amount of deflection and the control of a recording operation.

If it is found at step 123 that the ink pressure is not equal to the given low pressure or if the output from the low ink pressure detector circuit is not at L level, the control of the third stage is entered. The one second timer is initially examined to see if it has timed out, and if it has timed out, the pumps 74, 71 are deactivated (step 126). The five minutes timer is examined to see if it has timed out (step 130), and if it has timed out, the data which has been saved during the interrupt operation is loaded into the accumulator of CPU (step 128), all of the timers and the number of times counter N are cleared (step 129) and the alarm is activated, thus proceeding to the processing of the abnormality or the shutdown of the printer. If the five minutes timer has not timed out, the four seconds timer is started, thus waiting for it to time out. When it has timed out, 20% duty cycle control of the pump drive for one second is effected. If the signal level at the interrupt port assumes its L level ("high pressure") during the time such pump drive is executed, the program returns to the ink pressure control of the first stage. If the number of times counter N has a count which is equal to or greater than 6 at this time, the program proceeds to the control of the second stage shown in FIG. 10*b* without executing the control of the first stage. After passing through the control of the second stage, the program returns to the control of the third stage.

During the control of the third stage, if the five minutes timer times out while the ink pressure is less than "high pressure" or the output from the high ink pressure detector circuit is at L level, and the ink pressure is greater than "low pressure" or the output of the low ink pressure detector circuit is at L level, the program proceeds to the processing of the abnormality in the manner mentioned above. However, if "low pressure" is reached before the timer times out, the program returns to the main routine, or specifically, to the step 6 of FIG. 8*a*, thus driving the pump continuously. The above represents the on/off control of the pump with the duty cycle of 20% in the third stage.

When the ink pressure supplied to the head 61 which is attained as a result of the described ink pressure control reaches a given high pressure, the pump is driven according to the control of the first stage in which the pump drive is ceased for four seconds and then the pump is driven for one second to achieve a duty cycle of 20%, for a maximum length of thirty seconds. If the ink pressure is lowered from "high pressure" in the course of such control, a reduction to the given low pressure is considered as representing the fact that a proper injection of ink stream has been established, whereupon the ink pressure control is terminated and the pump is driven continuously. However, if the ink pressure has been lowered from "high pressure" but is not reduced enough to reach the given low pressure, the pump drive is controlled with a duty cycle of 20% in the third stage. Thus, the pump drive is controlled in the similar manner as in the first stage. On the contrary, if the ink pressure is not lowered from "high pressure" when the pump drive is controlled according to the first stage for a time duration of thirty seconds, the control proceeds to the second stage to decrease the ink pressure from "high pressure". If the pressure release control which takes place over a time period of four seconds fails to decrease the ink pressure from "high pressure", the program proceeds to the processing of abnormality. However, if the pressure release control successively decreases the ink pressure from "high pressure", the pump drive is controlled with a duty cycle of 20% in the third stage, which is similar to the first stage. When the ink pressure cannot be reduced down to the given low pressure within a time limit of five minutes since the beginning of the ink pressure control described above, the program proceeds to the processing of abnormality.

During the control of the ink pressure, as the pump ceases to be driven for four seconds and is driven for one second subsequently, pressure oscillations occur in the ink which is contained within the head, stimulating the ink to be projected from the nozzle. The rate of pressure rise of the ink within the head will be less than that achieved when the pump is driven continuously, and the pressure rise will be reduced if the nozzle is completely plugged. It is to be understood that the time interval of four seconds is less than the time duration which would be required to cause an overflow of ink from the gutter 65 when the projection of the ink stream occurs normally, and the time interval of one second is greater than the time required for the pump 91 to recover the entire ink within the gutte 65 into the ink vessel 72. In this manner, the duty cycle with which the pump is driven in an on/off manner is determined in consideration of the supply of fresh ink to the head when the nozzle is plugged, a reduced rate of ink pressure rise and the prevention of an overflow of ink when the nozzle allows a free passage of the ink stream.

As indicated at steps 6 to 14 of FIG. 8*a*, when a set-up is made to drive the pump continuously, the solenoid valve 76 is energized when the ink pressure has exceeded the given low pressure, thus supplying the ink under pressure to the head to excite the vibrator within the head. A temperature control is initiated, and a time interval of 60 seconds is allowed to pass before the phase retrieval is initiated. Failure of establishing a proper value during the phase retrieval or the following establishment of the amount of deflection is frequently caused by an improper projection of an ink stream. Accordingly, when a stabilized phase is not established during the phase retrieval step 14, the pump is ceased to be driven for five seconds, during which the solenoid valve 76 is deenergized, thus releasing the ink pressure from the head. The program then returns to the step 6 to initiate the continuous drive of the pump for the second time, beginning from a low pressure condition. In case a stabilized amount of deflection is not established during the step 15, the pump drive is controlled in an on/off manner with a duty cycle of 20%, and if the pressure is reduced, the program returns to the step 6 to initiate the continuous drive of the pump.

Figure 11:
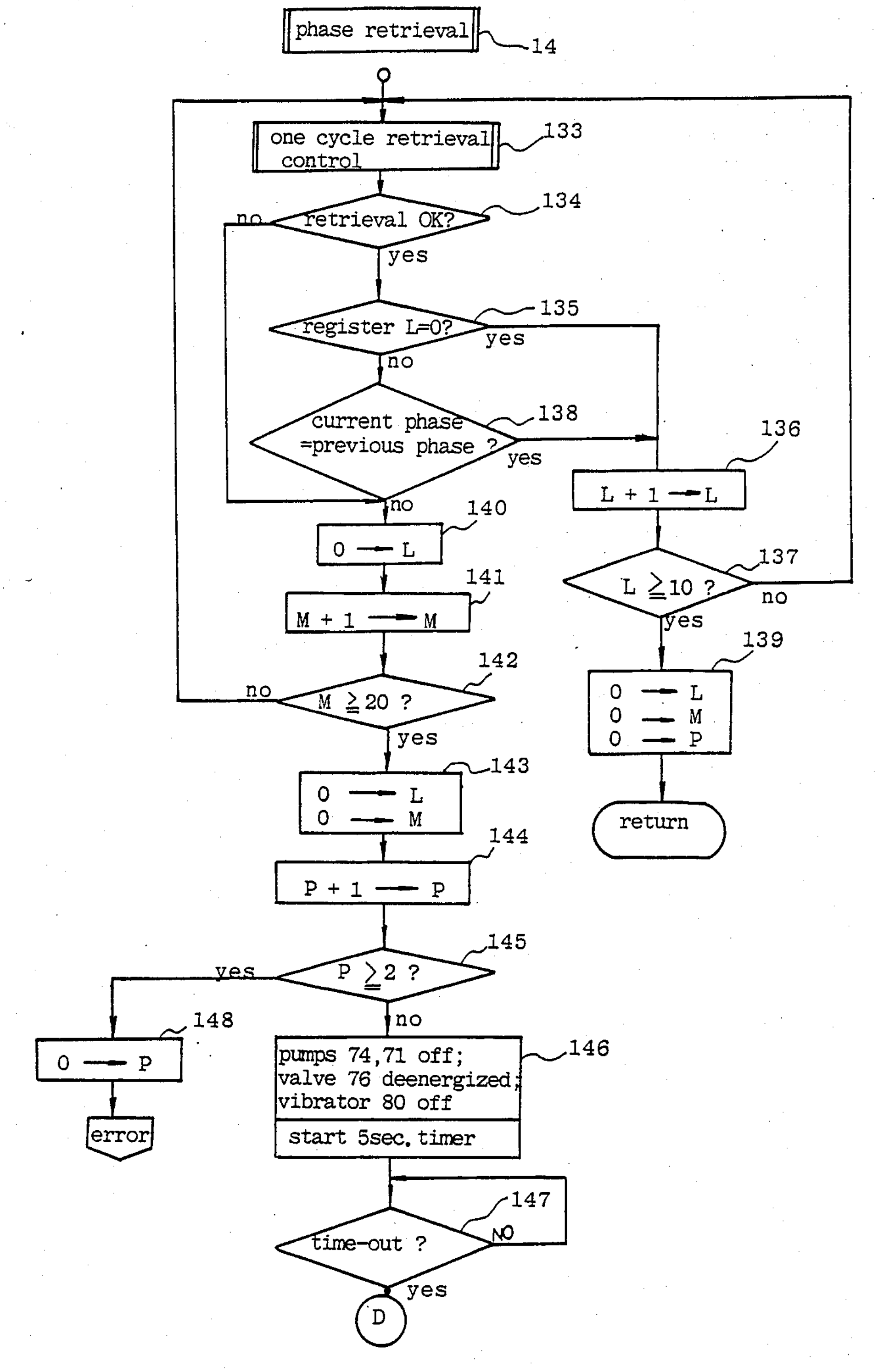

FIG. 11 shows a flowchart of the phase retrieval step 14. When the program proceeds to the phase retrieval, one cycle retrieval is executed in which the phase of a charging voltage relative to the phase of the ink separation, or conversely, the phase of the ink separation relative to the phase of the charging voltage is incrementally changed. When the charge on an ink particle is detected, the prevailing phase is stored as an optimum value. If an optimum value has been previously detected, the optimum value obtained during the present cycle is compared against the previous value, and if they agree with each other, the content of the optimum value detector register L is incremented by one. If the retrieval failed to detect the presence of the charge on the ink particle, or if the current phase disagrees with the previous phase, the register L is cleared while the error detector register M is incremented by one (steps 133 to 136, 140 and 141). This cycle is repeated. When the optimum value detector register L has a count equal to 10 (step 137), this means that the same optimum value has been detected ten times consecutively, and hence it is determined that the projection of the ink stream is stabilized. The register is then cleared (step 139) and the program proceeds to the establishment of an amount of deflection (step 15). If the error detector register M reaches a count of 20 when the optimum value detector register L does not reach a count of 10 (step 142), it is determined that the projection of the ink stream is unstable. The registers L and M are then cleared (step 143), and the phase retrieval error register P is incremented by one (step 144). If the count of the register P is not equal to 2 (step 145), the operation of the pumps 74, 71 is interrupted and the solenoid valve 76 is deenergized. The five seconds timer is started (step 146), and the program waits for the timer to time out (step 147), whereupon the program proceeds to the step 6 in which the pump is driven continuously. If the register P has a count of 2, this means that a stable phase could not have been established after two trials of the phase retrieval (step 14), (the first phase retrieval, being a failure, interrupting the projection of the ink stream, followed by another trial of phase retrieval after re-initiation of the projection of ink stream) and thus the register P is cleared and the program proceeds to the processing of abnormality.

Figure 12:
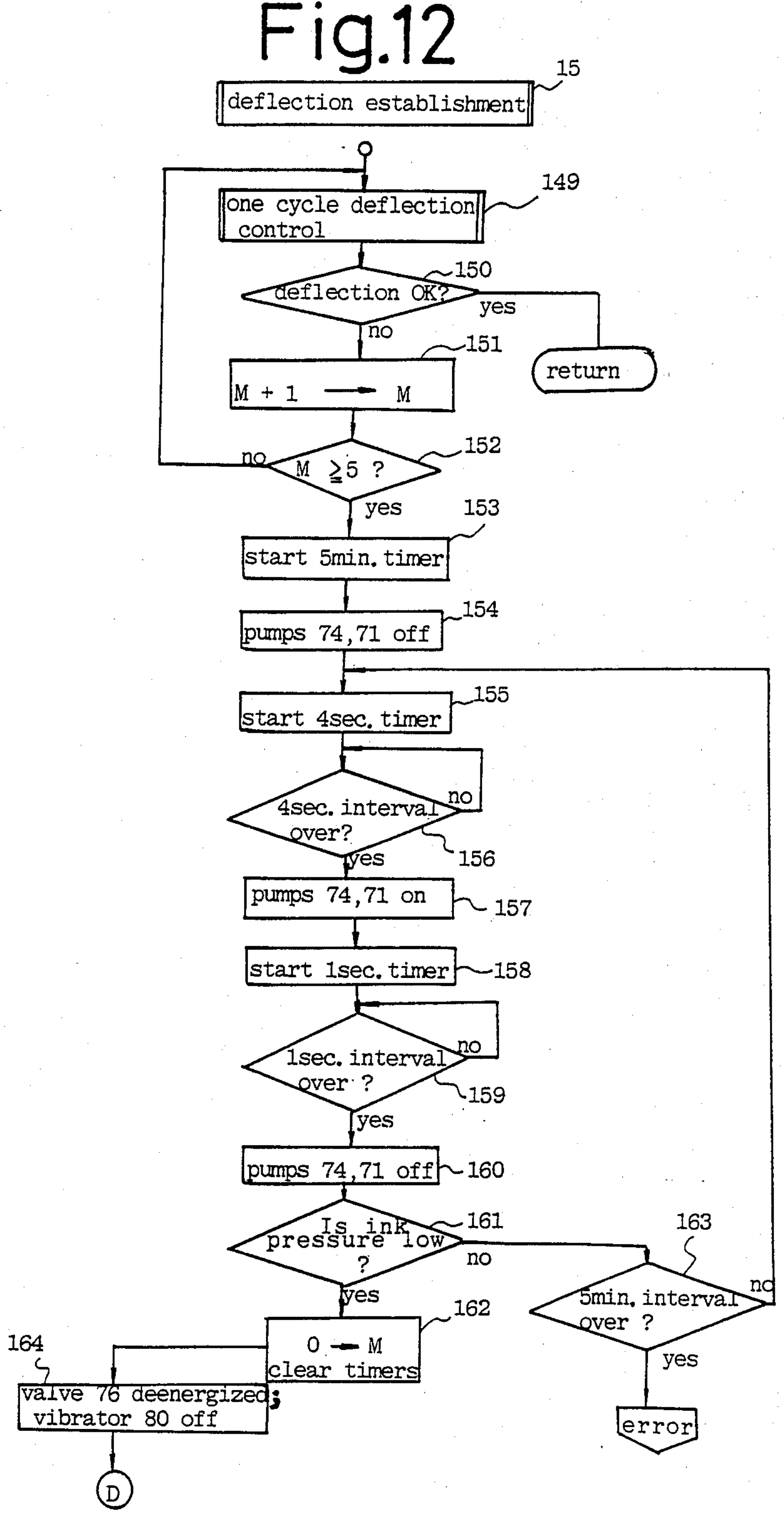

FIG. 12 shows a flowchart of the step 15 for establishing an amount of deflection. During the establishment of an amount of deflection, a one cycle control over the amount of deflection is executed by incrementally changing the charging voltage. When the electrode 67 detects a change from the charged to the noncharged condition, the prevailing charging voltage is compared against a given value, and a charging voltage for each deflection step or an amplification gain for the charging voltage is established based on the result of the comparison if that prevailing voltage represents an optimum value, before proceeding to the step 16 of FIG. 8*a* (steps 149 to 150 to return). If the prevailing voltage is not an optimum value or if the electrode has not detected a change from the charged to the non-charged condition, the content of error register M is incremented by one (step 151), followed by another cycle of deflection control. When the register M has a count equal to 5 as a result of such execution (step 152), this means that an amount of deflection could not have been established after five trials, and thus it is determined that the projection of the ink stream is improper. Accordingly, the five minutes timer is started (step 153), the drive to the pumps 74, 71 is interrupted (step 154), and the four seconds timer is started (step 155), thus waiting for the timer to time out. In other words, the operation of the pumps is interrupted for a time interval of four seconds. The pumps 74, 71 are then driven for one second (steps 157, 158, 159 and 160). Then the ink pressure is examined to see whether or not the given low pressure is reached (step 161). When the ink pressure has reduced to the low pressure, the register M and the both timers are cleared (step 162), the solenoid valve 76 is deenergized to deactivate the vibrator 80 (step 164), thus returning to the continuous drive of the pump (step 6). The process of ceasing to drive the pump for four seconds and to drive the pump for the following one second is repeated until the low pressure is reached. If the low pressure is not reached after repeating such process over five minutes, it is determined that the nozzle is completely plugged, thus proceeding to the processing of abnormality.

During the phase retrieval and the establishment of an amount of deflection mentioned above, it will be seen that a determination is initially made to see if the projection of the ink stream is proper or improper. If the projection is improper, the step 15 of establishing an amount of deflection is initially executed to control the ink pressure. If the ink pressure rises to a high value during the control over the ink pressure or if the ink pressure rises high subsequent to the establishment of an amount of deflection due to the fact that the projection of the ink stream has been temporarily proper or due to a light degree of improper projection in which the ink pressure rises over an increased length of time even though the projection of the ink stream has been proper during the phase retrieval and during an establishment of an amount of deflection, the control over the ink pressure which is responsive to the interrupt is executed.

In the embodiment described above, where the projection of the ink stream is improper, the ink supply to the head is continued by repeatedly driving and ceasing to drive the pump consistent with avoiding a rapid rise in the ink pressure, but other manners of operation are possible where the projection of the ink stream is improper, as by reducing the frequency of driving the pump or by reducing the voltage applied to a d.c. motor where such motor drives the pump.

As described, in accordance with the invention, an increase in the ink pressure or the disablement of establishing an amount of deflection which is principally caused by the improper projection of the ink stream is detected to initiate driving the pump so as to continue an ink supply under a reduced pressure, rather than immediately stopping the projection of the ink stream followed by the processing of abnormality. This increases the probability that the projection of the ink stream be automatically remedied, reducing the disablement of a print-out, frequent checks and cleanings of the head which may be caused or necessitated by the improper projection of an ink stream from the nozzle of the head to thereby increase the overall reliability of the printer.

Having described the preferred embodiment of the invention modifications will be evident to those skilled in the art without departing from the spirit and the scope of the invention as defined by the appended claims.

What is claimed is:

1. An ink jet printer comprising an ink vessel;

a pump for supplying an ink from the ink vessel to an ink stream projecting head under pressure;

detection means for detecting whether or not the projection of an ink stream from a projecting nozzle of head is proper;

a switching solenoid valve assembly having a first state in which a communication is established between the head and a low pressure vessel while a communication between the head and the low pressure vessel on one hand and the pump on the other hand is interrupted and a second state in which a communication is established between the discharge port of the pump and the head while a communication between the discharge port of the pump and the head on one hand and the low pressure vessel on the other hand is interrupted;

and an ink supply controller for controlling the drive to the pump and the state of the solenoid valve assembly, the ink supply controller being responsive to a detection by the detection means that the projection of the ink stream is improper by changing the drive to the pump so as to supply the ink under a reduced pressure.

2. An ink jet printer according to claim 1 in which when the ink supply controller changes the drive to the pump so as to supply the ink under a reduced pressure, the pump is driven in an on/off manner with a given duty cycle in which the pump ceases to be driven for a given time interval, followed by another given time interval during which it is driven.

3. An ink jet printer according to claim 1 in which when the detection means detect the improper projection of the ink stream after a given time duration during which the pump is driven to supply the ink under a reduced pressure, the ink supply controller alternately and repeatedly switching the solenoid valve assembly between the first and the second state.

4. An ink jet printer according to claim 3 in which when the detection means detects the proper projecion of the ink stream during the time the solenoid valve assembly is alternately and repeatedly switched between the first and the second state, the ink supply controller changes the drive to the pump to a continuous drive.

5. An ink jet printer according to claim 1 in which the detection means comprises ink pressure detection means for detecting an ink pressure in a path from the pump to the nozzle and in which the ink supply controller causes the pump to be driven so as to supply the ink under the reduced pressure by alternately and repeatedly driving and ceasing to drive the pump when the ink pressure detection means has detected a high pressure.

6. An ink jet printer according to claim 5 in which when the ink pressure detection means detects a high pressure after a given number of times that the pump is alternately and repeatedly driven and ceases to be driven, the ink supply controller alternately switches the solenoid valve assembly between the first and the second state.

7. An ink jet printer according to claim 6 in which when the ink pressure decreases from the high pressure during the time the solenoid valve assembly is alternately and repeatedly switched between the first and the second state, the ink supply controller alternately and repeatedly drives and ceases to drive the pump.

8. An ink jet printer according to claim 7 in which the ink supply controller continuously drives the pump when the ink pressure is further reduced during the time the pump is alternately and repeatedly driven and ceases to be driven after the ink pressure has decreased from the high pressure.

9. An ink jet printer according to claim 8 in which the ink supply controller ceases to drive the pump when the ink pressure has not reached a further reduced value after a given time interval from the initial detection of the high ink pressure.

* * * * *